(12) United States Patent
Kawai et al.

(10) Patent No.: US 9,204,020 B2
(45) Date of Patent: Dec. 1, 2015

(54) COLOR IMAGING APPARATUS HAVING COLOR IMAGING ELEMENT

(71) Applicant: FUJIFILM Corporation, Tokyo (JP)

(72) Inventors: Tomoyuki Kawai, Saitama (JP); Kenkichi Hayashi, Saitama (JP); Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/314,591

(22) Filed: Jun. 25, 2014

(65) Prior Publication Data
US 2014/0307133 A1 Oct. 16, 2014

Related U.S. Application Data

(63) Continuation of application No. PCT/JP2012/083841, filed on Dec. 27, 2012.

(30) Foreign Application Priority Data

Dec. 27, 2011 (JP) .................................. 2011-286010

(51) Int. Cl.
H04N 9/083 (2006.01)
H04N 5/217 (2011.01)
(Continued)

(52) U.S. Cl.
CPC .............. H04N 5/2173 (2013.01); H04N 5/357 (2013.01); H04N 9/045 (2013.01); H04N 9/07 (2013.01); H04N 13/0217 (2013.01); H04N 13/0257 (2013.01); H04N 2209/045 (2013.01)

(58) Field of Classification Search
None
See application file for complete search history.

(56) References Cited

U.S. PATENT DOCUMENTS 5,889,554 A 3/1999 Mutze
2002/0149686 A1 10/2002 Taubman
(Continued)

FOREIGN PATENT DOCUMENTS

JP 02210996 A 8/1990
JP 8-23542 A 1/1996
(Continued)

OTHER PUBLICATIONS

International Preliminary Report on Patentability for PCT/JP2012/083841 completed on May 16, 2013.
(Continued)

Primary Examiner — Twyler Haskins
Assistant Examiner — Wesley J Chiu
(74) Attorney, Agent, or Firm — Birch, Stewart, Kolasch & Birch, LLP

(57) ABSTRACT

A single-plate color imaging element, where color filters of the same color are arranged on a predetermined number of vertically and horizontally adjacent photoelectric conversion elements, the color filter array includes a plurality of unit blocks including the color filters arranged on the predetermined number of vertically and horizontally adjacent photoelectric conversion elements, the color filter array includes a basic array pattern including the unit blocks arranged in a square grid shape, one or more first filters are arranged in the horizontal, vertical, upper right, and lower right directions of the color filter array, one or more second filters corresponding to each color of the second color are arranged in the horizontal and vertical directions of the color filter array, and a proportion of the number of pixels of the first color is greater than a proportion of the number of pixels of each color of the second color.

3 Claims, 17 Drawing Sheets

(51) Int. Cl.
*H04N 9/07* (2006.01)
*H04N 9/04* (2006.01)
*H04N 5/357* (2011.01)
*H04N 13/02* (2006.01)

(56) References Cited

U.S. PATENT DOCUMENTS

| | | |
|---|---|---|
| 2004/0109068 A1 | 6/2004 | Mitsunaga et al. |
| 2004/0169747 A1 | 9/2004 | Ono et al. |
| 2006/0012808 A1 | 1/2006 | Mizukura et al. |
| 2006/0203113 A1* | 9/2006 | Wada et al. .................... 348/302 |
| 2007/0153104 A1 | 7/2007 | Ellis-Monaghan et al. |
| 2007/0159544 A1* | 7/2007 | Hu ................................ 348/273 |
| 2008/0151083 A1 | 6/2008 | Hains et al. |
| 2009/0027527 A1* | 1/2009 | Pang et al. .................... 348/280 |
| 2009/0200451 A1 | 8/2009 | Conners |
| 2010/0128152 A1 | 5/2010 | Hayasaka et al. |
| 2011/0019041 A1* | 1/2011 | Ishiwata et al. ............... 348/280 |
| 2011/0069189 A1 | 3/2011 | Venkataraman et al. |
| 2012/0025060 A1 | 2/2012 | Iwata |
| 2013/0293760 A1* | 11/2013 | Nisenzon et al. ............. 348/336 |
| 2014/0009655 A1* | 1/2014 | Hayashi ........................ 348/302 |
| 2014/0307123 A1* | 10/2014 | Kurahashi et al. ......... 348/224.1 |
| 2014/0307138 A1* | 10/2014 | Hayashi et al. ............... 348/280 |
| 2015/0109498 A1* | 4/2015 | Aoki et al. .................... 348/280 |

FOREIGN PATENT DOCUMENTS

| | | |
|---|---|---|
| JP | 8-23543 A | 1/1996 |
| JP | 11-285012 A | 10/1999 |
| JP | 2000-308080 A | 11/2000 |
| JP | 2002-84548 A | 3/2002 |
| JP | 2003-284084 A | 10/2003 |
| JP | 2004-221839 A | 8/2004 |
| JP | 2004-266369 A | 9/2004 |
| JP | 2005-136766 A | 5/2005 |
| JP | 1 793 620 A1 | 6/2007 |
| JP | 2007-184904 A | 7/2007 |
| JP | 2007-306490 A | 11/2007 |
| JP | 2008-236620 A | 10/2008 |
| JP | 2010-512048 A | 4/2010 |
| JP | 2010-153511 A | 7/2010 |
| JP | 2010-154493 A | 7/2010 |
| JP | 2011-29379 A | 2/2011 |
| JP | 2011-523538 A | 8/2011 |
| WO | WO 02/056604 A1 | 7/2002 |
| WO | WO 2008/066698 A2 | 6/2008 |
| WO | WO 2009/151903 A2 | 12/2009 |

OTHER PUBLICATIONS

International Search Report for PCT/JP2012/083841 mailed on Feb. 5, 2013.
Office Action issued in Chinese Patent Application No. 201180022503.3, issued on May 23, 2013.
Written Opinion of the International Searching Authority for PCT/JP2012/083841 mailed on Feb. 5, 2013.
Written Opinion of the International Searching Authority issued in PCT/JP2012/080898, mailed on Jan. 22, 2013.
Written Opinion of the International Searching Authority issued in PCT/JP2012/080899, mailed on Jan. 15, 2013.
Written Opinion of the International Searching Authority issued in PCT/JP2012/081644, mailed on Jan. 15, 2013.
Written Opinion of the International Searching Authority issued in PCT/JP2012/083583, mailed on Jan. 29, 2013.
European Search Report in Application No. EP11859479 mailed on Aug. 4, 2014.
European Search Report in Application No. EP11859950 mailed on Oct. 28, 2014.
European Search Report in Application No. EP12804973 mailed on Jan. 27, 2015.
Hirakawa, K. "Spatio-Spectral Color Filter Array Design for Optimal Image Recovery," IEEE Transactions on Image Processing 17:10:1876-1890 (Oct. 2008).

* cited by examiner

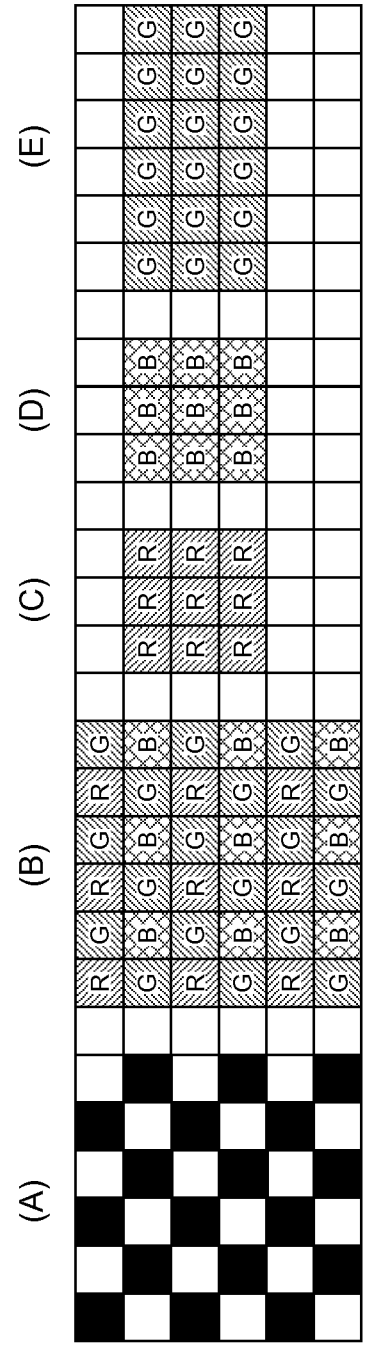

COLOR IMAGING APPARATUS HAVING COLOR IMAGING ELEMENT

CROSS-REFERENCE TO RELATED APPLICATIONS

This application is a Continuation of PCT International Application No. PCT/JP2012/083841 filed on Dec. 27, 2012, which claims priority under 35 U.S.C §119(a) to Japanese Patent Application No. 2011-286010 filed on Dec. 27, 2011. Each of the above application(s) is hereby expressly incorporated by reference, in its entirety, into the present application.

BACKGROUND OF THE INVENTION

1. Field of the Invention

The present invention relates to a color imaging element, and particularly, to a color imaging element that can suppress generation of color moire and increase resolution.

2. Description of the Related Art

An output image of a single-plate color imaging element is a RAW image (mosaic image). Therefore, a multi-channel image is obtained by a process of interpolating (demosaicing process) a pixel of a missing color from a surrounding pixel.

The demosaicing process is a process of calculating all color information of each pixel from a mosaic image corresponding to a color filter array of the single-plate color imaging element and is also called synchronization processing. For example, in a case of an imaging element including color filters of three RGB colors, the color information of all of RGB is calculated in the process for each pixel from the mosaic image made of RGB.

In this case, there is a problem in reproduction characteristics of a high-frequency image signal. Compared to a black and white imaging element, aliasing easily occurs in an image taken by a color imaging element, and it is important to expand a reproduction band to increase resolution while suppressing generation of color moire (false color).

A primary-color Bayer array as a color array most widely used in the single-plate color imaging element includes green (G) pixels arranged in a check pattern and red (R) and blue (B) arranged line-sequentially. Therefore, G signals have a problem of reproduction accuracy in generation of high frequency signals in oblique directions, and R and B signals have a problem of reproduction accuracy in generation of high frequency signals in horizontal and vertical directions.

A black and white vertical-striped pattern (high frequency image) as shown in (A) portion of FIG. 21 enters an imaging element in a Bayer array shown in (B) portion of FIG. 21, and the pattern is sorted into Bayer color arrays to compare the colors. As shown in (C) to (E) portions of FIG. 21, R forms a light and flat color image, B forms a dark and flat color image, and G forms a light and dark mosaic color image. Although there is no density difference (level difference) between RGB with respect to the original black and white image, the image is colored depending on the color array and the input frequency.

Similarly, a black and white oblique high frequency image as shown in (A) portion of FIG. 22 enters an imaging element in a Bayer array shown in (B) portion of FIG. 22, and the image is sorted into Bayer color arrays to compare the colors. As shown in (C) to (E) portions of FIG. 22, R and B form light and flat color images, while G forms a dark and flat color image. Assuming that the value of black is 0 and the value of white is 255, the black and white oblique high frequency image turns green, because only G is 255.

In this way, the oblique high frequency image cannot be correctly reproduced in the Bayer array.

In the imaging apparatus using the single-plate color imaging element, an optical low-pass filter formed by an anisotropic substance such as crystal is generally arranged on the front side of the color imaging element to prevent optically reducing the high frequency wave. However, although the coloring caused by folding of the high frequency signal can be reduced in the method, there is a problem that the resolution is reduced accordingly.

To solve the problem, a color imaging element is proposed, wherein a color filter array of the color imaging element is a three-color random array satisfying array restrictions in which an arbitrary target pixel is adjacent to three colors including the color of the target pixel on four sides of the target pixel (Japanese Patent Application Laid-Open No. 2000-308080; PTL 1).

An image sensor of a color filter array is also proposed, wherein the image sensor includes a plurality of filters with different spectral sensitivity, and first and second filters among the plurality of filters are alternately arranged in a first predetermined period in one of the diagonal directions of a pixel grid of the image sensor and are alternately arranged in a second predetermined period in the other diagonal direction (Japanese Patent Application Laid-Open No. 2005-136766; PTL 2).

A color array is further proposed, wherein in a color solid-state imaging element of three primary colors of RGB, sets of three pixels including horizontally arranged R, G, and B are arranged in a zigzag manner in the vertical direction to make appearance frequencies of RGB equal and to cause arbitrary lines (horizontal, vertical, and oblique lines) on an imaging plane to pass through all colors (Japanese Patent Application Laid-Open No. 11-285012; PTL 3).

Furthermore, a color imaging element is also proposed, wherein R and B among the three primary colors of RGB are arranged every three pixels in horizontal and vertical directions, and G is arranged between R and B (Japanese Patent Application Laid-Open No. 8-23543; PTL 4).

An imaging element is also proposed, wherein two G pixels are lined up in each of the horizontal direction and the vertical direction to arrange four pixels, and one on-chip lens is provided for the four pixel group (Japanese Patent Application Laid-Open No. 2011-29379; PTL 5).

SUMMARY OF THE INVENTION

In the color imaging element described in PTL 1, the filter arrays are random, and each random pattern needs to be optimized in a demosaicing process in a later stage. There is a problem that the demosaicing process is cumbersome. Although the random arrays are effective for color moire in a low frequency wave, the random arrays are not effective for a false color at a high frequency section.

In the image sensor described in PTL 2, the G pixels (luminance pixels) are arranged in a check pattern. Therefore, there is a problem that the pixel reproduction accuracy in a limit resolution area (particularly in oblique directions) is not excellent.

The color solid-state imaging element described in PTL 3 includes filters of all colors on arbitrary lines and has an advantage that the generation of false color can be suppressed. However, the proportions of the numbers of pixels of RGB are equal, and there is a problem that the high frequency reproducibility is lower than that in a Bayer array. In the Bayer array, the proportion of the number of pixels of G that most contributes to obtaining luminance signals is twice the proportions of the numbers of pixels of R and B.

Meanwhile, in the color imaging element described in PTL 4, the proportion of the number of pixels of G with respect to the numbers of pixels of R and B is greater than that in the Bayer array, but there are lines with only G pixels in the horizontal or vertical direction. Therefore, the color imaging element is not effective for the false color at a high frequency section in the horizontal or vertical direction.

In the imaging element described in PTL 5, four lined up G pixels and a set of diagonally arranged two B pixels and two R pixels are alternately lined up. Therefore, the imaging element is not effective in suppressing the generation of the false color.

The present invention has been made in view of the circumstances, and an object of the present invention is to provide a color imaging element that can suppress the generation of false color and increase the resolution and that can simplify the process of a later stage compared to the conventional random array.

To attain the object, a color imaging element according to an aspect of the present invention is a single-plate color imaging element including color filters in a specific color filter array, which includes first filters corresponding to a first color with one or more colors and second filters corresponding to a second color with two or more colors with contribution ratios for obtaining luminance signals lower than the first color, on a plurality of pixels formed by photoelectric conversion elements, wherein color filters of the same color are arranged on a predetermined number of vertically and horizontally adjacent photoelectric conversion elements, the color filter array includes a plurality of unit blocks, each unit block including the color filters arranged on the predetermined number of vertically and horizontally adjacent photoelectric conversion elements, the color filter array includes a basic array pattern including the unit blocks arranged in a square grid shape, the basic array pattern is repeatedly arranged in a horizontal direction and a vertical direction, one or more first filters are arranged in each line in the horizontal, vertical, upper right, and lower right directions of the color filter array, one or more second filters corresponding to each color of the second color are arranged in each line in the horizontal and vertical directions of the color filter array, and a proportion of the number of pixels of the first color corresponding to the first filters is greater than a proportion of the number of pixels of each color of the second color corresponding to the second filters.

According to the color imaging element of the aspect of the present invention, the color filters of a predetermined color among the first filters corresponding to a first color with one or more colors and the second filters corresponding to a second color with two or more colors with the contribution ratios for obtaining the luminance signals lower than the first color are arranged on the predetermined number of vertically and horizontally adjacent photoelectric conversion elements, the color filter array includes the basic array pattern including the plurality of unit blocks arranged in the square grid shape, each unit block including the color filters arranged on the predetermined number of vertically and horizontally adjacent photoelectric conversion elements, and the basic array pattern is repeatedly arranged in the horizontal direction and the vertical direction.

As a result, a process can be executed according to the repeated pattern in a demosaicing process in a later stage, and processing in the later stage can be simplified compared to the conventional random array.

Since one or more first color filters are arranged in each line in the horizontal, vertical, upper right, and lower right directions of the color filter array, the reproduction accuracy of the demosaicing process in a high frequency area can be improved. Furthermore, one or more second filters are arranged in each line in the horizontal and vertical directions of the color filter array in the basic array pattern. This can suppress the generation of color moire (false color) to increase the resolution.

The proportion of the number of pixels of the first color corresponding to the first filters and the proportion of the number of pixels of each color of the second color corresponding to the second filters are different, and particularly, the proportion of the number of pixels of the first color with the contribution ratio for obtaining the luminance signal is greater than the proportion of the number of pixels of each color of the second color corresponding to the second filters. Therefore, aliasing can be suppressed, and high frequency reproducibility can be improved.

A color imaging element according to an aspect of the present invention is a single-plate color imaging element including color filters in a specific color filter array, which includes first filters corresponding to a first color with one or more colors and second filters corresponding to a second color with two or more colors with contribution ratios for obtaining luminance signals lower than the first color, on a plurality of pixels formed by photoelectric conversion elements arranged in a diagonal grid shape with centers of adjacent elements shifted at a ½ pixel pitch in a horizontal direction and a vertical direction, wherein color filters of the same color are arranged on a predetermined number of photoelectric conversion elements adjacent in upper right and lower right directions, the color filter array includes a plurality of unit blocks, each unit block including the color filters arranged on the predetermined number of photoelectric conversion elements adjacent in the upper right and lower right directions, the color filter array includes a basic array pattern including the unit blocks arranged in a diagonal grid shape, the basic array pattern is repeatedly arranged in the upper right and lower right directions, one or more first filters are arranged in each line in the horizontal, vertical, upper right, and lower right directions of the color filter array, one or more unit blocks provided with the second filters corresponding to each color of the second color are arranged in each line in the upper right and lower right directions of the color filter array, and a proportion of the number of pixels of the first color corresponding to the first filters is greater than a proportion of the number of pixels of each color of the second color corresponding to the second filters.

According to the color imaging element of the aspect of the present invention, the color filters of the predetermined color among the first filters corresponding to a first color with one or more colors and the second filters corresponding to a second color with two or more colors with the contribution ratios for obtaining the luminance signals lower than the first color are arranged on the predetermined number of photoelectric conversion elements adjacent in the upper right and lower right directions among the photoelectric conversion elements arranged in the diagonal grid shape with the centers of the adjacent elements shifted at a ½ pixel pitch in the horizontal direction and the vertical direction, the color filter array includes the basic array pattern including the plurality of unit blocks arranged in the diagonal grid shape, each unit block including the color filters arranged on the predetermined number of photoelectric conversion elements adjacent in the upper right and lower right directions, and the basic array pattern is repeatedly arranged in the upper right and lower right directions.

As a result, the process can be executed according to the repeated pattern in the demosaicing process in the later stage, and processing in the later stage can be simplified compared to the conventional random array.

Since one or more first filters are arranged in each line in the horizontal, vertical, upper right, and lower right directions of the color filter array, the reproduction accuracy of the demosaicing process in a high frequency area can be improved. Furthermore, one or more second filters are arranged in each line in the upper right and lower right directions of the color filter array in the basic array pattern. This can suppress the generation of color moire (false color) to increase the resolution.

The proportion of the number of pixels of the first color corresponding to the first filters and the proportion of the number of pixels of each color of the second color corresponding to the second filters are different, and particularly, the proportion of the number of pixels of the first color with a high contribution ratio for obtaining the luminance signal is greater than the proportion of the number of pixels of each color of the second color corresponding to the second filters. Therefore, aliasing can be suppressed, and high frequency reproducibility can be improved.

In the color imaging element according to another aspect of the present invention, it is desirable that the predetermined number of photoelectric conversion elements include 2×2 pixels or 3×3 pixels.

In the color imaging element according to another aspect of the present invention, it is desirable that the color filter array in the basic array pattern is point-symmetric with respect to the center of the basic array pattern.

This can reduce the circuit size of a processing circuit in the later stage.

In the color imaging element according to another aspect of the present invention, it is desirable that the basic array pattern is a unit block of N×N (N: integer 4 or more and 8 or less).

In the color imaging element according to another aspect of the present invention, it is desirable that the basic array pattern is a unit block of 6×6.

In the color imaging element according to another aspect of the present invention, it is desirable that in the color filter array, the unit blocks provided with the first filters are arranged at a center and four corners in 3×3 unit blocks. As a result, the first filters can be arranged in each line in the horizontal, vertical, upper right, and lower right directions of the color filter array.

It is desirable that the color imaging element according to another aspect of the present invention includes a pupil division device arranged above the photoelectric conversion elements, wherein light incident on the pupil division device is pupil-divided and guided to light receiving surfaces of the predetermined number of photoelectric conversion elements. As a result, a number of different image data that is the same number as the predetermined number can be acquired.

In the color imaging element according to another aspect of the present invention, it is preferable that the first color is green (G), and the second color is red (R) and blue (B).

In the color imaging element according to another aspect of the present invention, it is desirable that the basic array pattern is a square array pattern corresponding to a unit block of 6×6, and the color filter array includes first arrays and second arrays alternately arranged in the horizontal direction and the vertical direction, the first array corresponding to 3×3 unit blocks, the first array including unit blocks of G filters arranged at a center and four corners, the first array including unit blocks of B filters arranged above and below across the G filter at the center, the first array including unit blocks of R filters arranged on the left and right, the second array corresponding to 3×3 unit blocks, the second array including unit blocks of G filters arranged at a center and four corners, the second array including unit blocks of R filters arranged above and below across the G filter at the center, the second array including unit blocks of B filters arranged on the left and right. The present invention also includes an imaging apparatus including the color imaging element.

According to the present invention, the generation of the false color can be suppressed, the resolution can be increased, and the processing in the later stage can be simplified compared to the conventional random array.

BRIEF DESCRIPTION OF THE DRAWINGS

FIG. 6 is a diagram showing a color filter array of a color imaging element according to a first modified example of the first embodiment.

FIG. 11 is a diagram showing a second embodiment of the single-plate color imaging element according to the present invention.

FIG. 12 is a diagram showing a third embodiment of the single-plate color imaging element according to the present invention.

FIG. 13 is a diagram showing a fourth embodiment of the single-plate color imaging element according to the present invention.

FIG. 14 is a diagram showing a fifth embodiment of the single-plate color imaging element according to the present invention.

FIG. 16 is a diagram showing a seventh embodiment of the single-plate color imaging element according to the present invention.

FIG. 17 is a diagram showing an eighth embodiment of the single-plate color imaging element according to the present invention.

FIG. 22 is another diagram used to explain a problem of a color imaging element with color filters in a conventional Bayer array.

DETAILED DESCRIPTION OF THE PREFERRED EMBODIMENTS

Hereinafter, preferred embodiments of a color imaging element according to the present invention will be described in detail with reference to the attached drawings.

First Embodiment

[Imaging Device]

Figure 1:
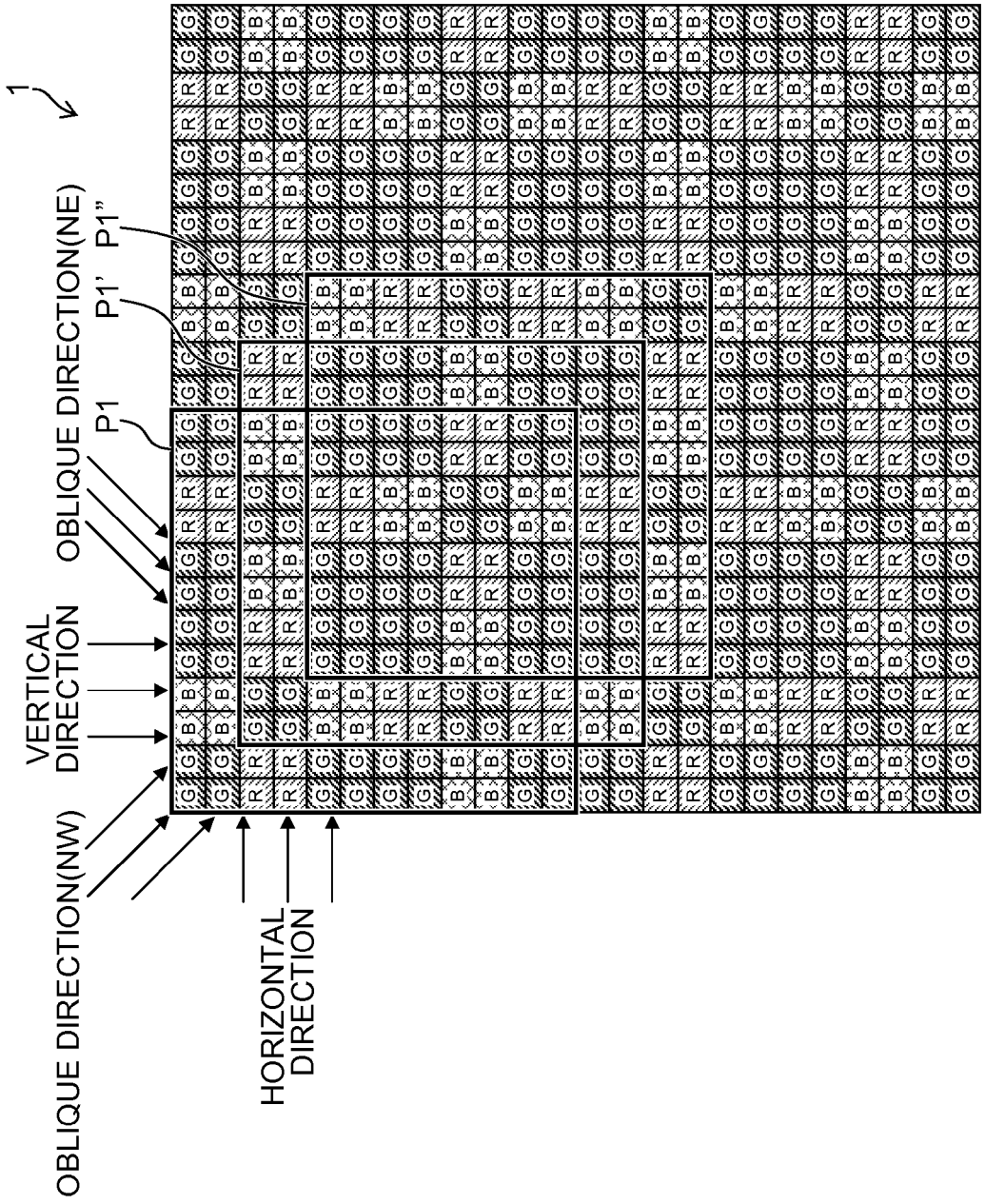
FIG. 1 is a diagram showing a first embodiment of a single-plate color imaging element according to the present invention.

FIG. 1 is a diagram showing a first embodiment of a single-plate color imaging element according to the present invention. FIG. 1 particularly shows a color filter array of color filters arranged on the color imaging element.

This color imaging element 1 includes: a plurality of pixels (not shown) formed by photoelectric conversion elements (for example, photodiodes) arranged in horizontal and vertical directions (two-dimensional arrangement); and color filters in a color filter array shown in FIG. 1 arranged on light receiving surfaces of the pixels. One of the color filters of three primary colors of red (R), green (G), and blue (B) is arranged on each pixel.

The color imaging element is not limited to a CCD (Charge Coupled Device) color imaging element and may be another type of imaging element such as a CMOS (Complementary Metal Oxide Semiconductor) imaging element.

Figure 2:
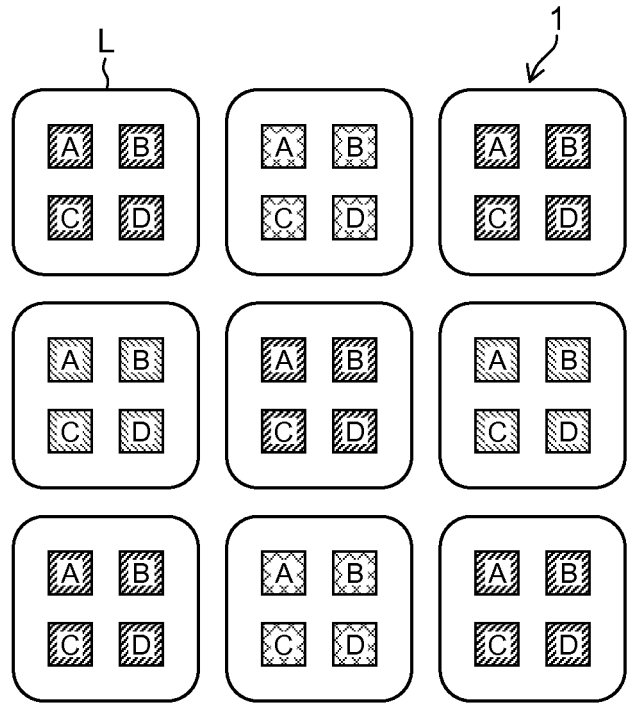
FIG. 2 is a diagram showing a configuration example of light receiving surfaces of the color imaging element according to a first embodiment.

As shown in FIG. 1, color filters of the same color are arranged for four vertically and horizontally adjacent photoelectric conversion elements. As shown in FIG. 2, one microlens L is arranged for the four photoelectric conversion elements provided with the color filters of the same color. The microlens L collects the light flux on the light receiving surfaces of the four photoelectric conversion elements, and light with the light flux limited in different directions (pupil-divided light) is incident on the four photoelectric conversion elements. More specifically, the color imaging element 1 can acquire image data from four viewpoints.

According to the color imaging element 1, a 2D image and a 3D image can be generated based on output signals output from the four photoelectric conversion elements that receive the light which is pupil-divided by the microlens L. A generation method of the 2D image and the 3D image will be described later.

[Features of Color Filter Array]

The color filter array of the color imaging element of the first embodiment has the following features (1), (2), (3), (4), (5), and (6). Hereinafter, the color filters of the same color arranged for the four photoelectric conversion elements that receive the object light passed through one microlens L will be described as a unit block.

{Feature (1)}

The color filter array shown in FIG. 1 includes a basic array pattern PI (pattern indicated by a thick frame) formed by a square array pattern corresponding to 6×6 blocks, and the basic array pattern PI is repeatedly arranged in the horizontal and vertical directions. Therefore, the color filter array includes filters of R, G, and B colors (R filters, G filters, and B filters) arranged in a cycle.

In this way, the R filters, the G filters, and the B filters are arranged in a cycle. Therefore, a demosaicing process and the like of R, G, and B signals read out from the color imaging element can be processed according to the repeated pattern.

When a thinning-out process is executed based on the basic array pattern PI to reduce the image, the color filter array of the reduced image after the thinning-out process can be the same as the color filter array before the thinning-out process. Therefore, a common processing circuit can be used.

{Feature (2)}

In the color filter array shown in FIG. 1, the one or more G filters corresponding to the color (color of G in the embodiment) that most contributes to obtaining luminance signals are arranged in each line in the horizontal, vertical, and oblique (NE, NW) directions of the color filter array. Reference character NE designates an upper right direction, and reference character NW designates a lower right direction. For example, in a case of an array of square pixels, the upper right and lower right directions are directions of 45° from the horizontal direction. In a case of an array of rectangular pixels, the upper right and lower right directions are directions of the diagonal lines of the rectangle, and the angles may vary depending on the lengths of the long side and the short side.

The G filters corresponding to the luminance pixels are arranged in each line in the horizontal, vertical, and oblique (NE, NW) directions of the color filter array. Therefore, the reproduction accuracy of the demosaicing process in a high frequency area can be improved regardless of the direction of the high frequency wave.

{Feature (3)}

In the basic array pattern P1 of the color filter array shown in FIG. 1, the numbers of pixels of the R pixels, the G pixels, and the B pixels corresponding to the R, G, and B filters in the basic array pattern P1 are 32 pixels (4 pixels×8 blocks), 80 pixels (4 pixels×20 blocks), and 32 pixels (4 pixels×8 blocks), respectively. Therefore, the ratio of the numbers of pixels of the RGB pixels is 2:5:2, and the proportion of the number of G pixels that most contribute to obtaining the luminance signals is greater than the proportions of the numbers of R and B pixels of other colors.

The proportion of the number of G pixels and the proportions of the numbers of R and B pixels are different, and particularly, the proportion of the number of G pixels that most contribute to obtaining the luminance signals is greater than the proportions of the numbers of R and B pixels. Therefore, aliasing in the demosaicing processing can be suppressed, and high frequency reproducibility can be improved.

{Feature (4)}

In the color filter array shown in FIG. 1, one or more R and B filters corresponding to two or more colors other than the color of G (colors of R and B in the embodiment) are arranged in each line in the horizontal and vertical directions of the color filter array in the basic array pattern PI.

The R and B filters are arranged in each line in the horizontal and vertical directions of the color filter array. Therefore, the generation of color moire (false color) can be suppressed. As a result, it is possible not to arrange an optical low-pass filter for suppressing the generation of false color on an optical path from a plane of incident to an imaging plane of the optical system. Even if the optical low-pass filter is applied, a filter with less effect of cutting high frequency components for preventing the generation of false color can be applied, and a loss of resolution can be prevented.

Figure 3:
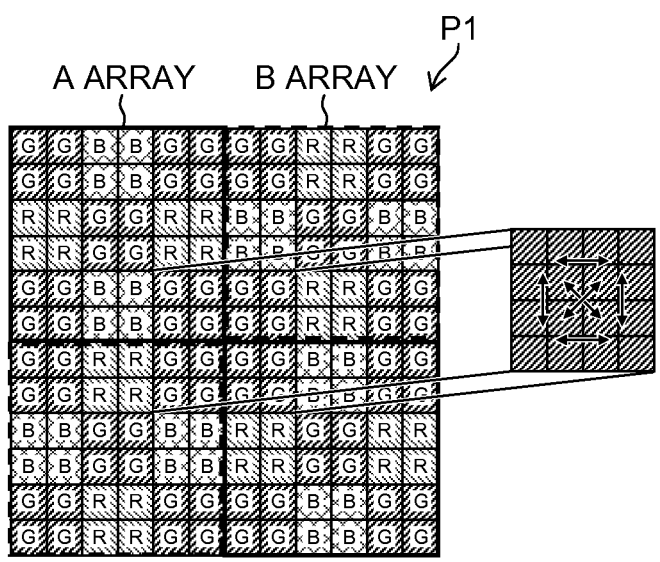
FIG. 3 is a diagram showing a state in which a basic array pattern of 12×12 pixels included in a color filter array of the color imaging element of the first embodiment is divided into A arrays and B arrays of 6×6 pixels and arranged, the diagram also showing a method of determining a correlation direction from pixel values of G pixels of 2×2 pixels included in the color filter array.

FIG. 3 shows a state in which the basic array pattern PI shown in FIG. 1 is divided into four sets of 3×3 blocks.

As shown in FIG. 3, the basic array pattern PI can be perceived as a pattern including A arrays of 3×3 blocks surrounded by a frame of solid lines and B arrays of 3×3 blocks surrounded by a frame of broken lines alternately arranged in the horizontal and vertical directions.

Each of the A and B arrays includes G filters as luminance pixels arranged on blocks at four corners and a center. In other words, the G filters are arranged on both diagonals. In the A array, the R filters are arranged in the horizontal direction, and the B filters are arranged in the vertical direction, across the G filter at the center. Meanwhile, in the B array, the B filters are arranged in the horizontal direction, and the R filters are arranged in the vertical direction, across the G filter at the center. Therefore, although the positional relationship between the R and B filters is opposite in the A and B arrays, the rest of the arrangement is the same.

The A and B arrays are alternately arranged in the horizontal and vertical directions as shown in FIG. 3, and the G filters at four corners of the A and B arrays form G filters of square arrays corresponding to 2×2 blocks.

The G filters as luminance pixels are arranged on the blocks at the four corners and the center in 3×3 blocks in the A and B arrays, that is, on two diagonals, and the 3×3 blocks are alternately arranged in the horizontal and vertical directions to form the G filters in the square arrays corresponding to 2×2 pixels. The arrays satisfy the features (1), (2), and (3), as well as a feature (5) described below.

{Feature (5)}

The color filter array shown in FIG. 1 includes square arrays corresponding to 2×2 blocks of G filters.

Figure 4:
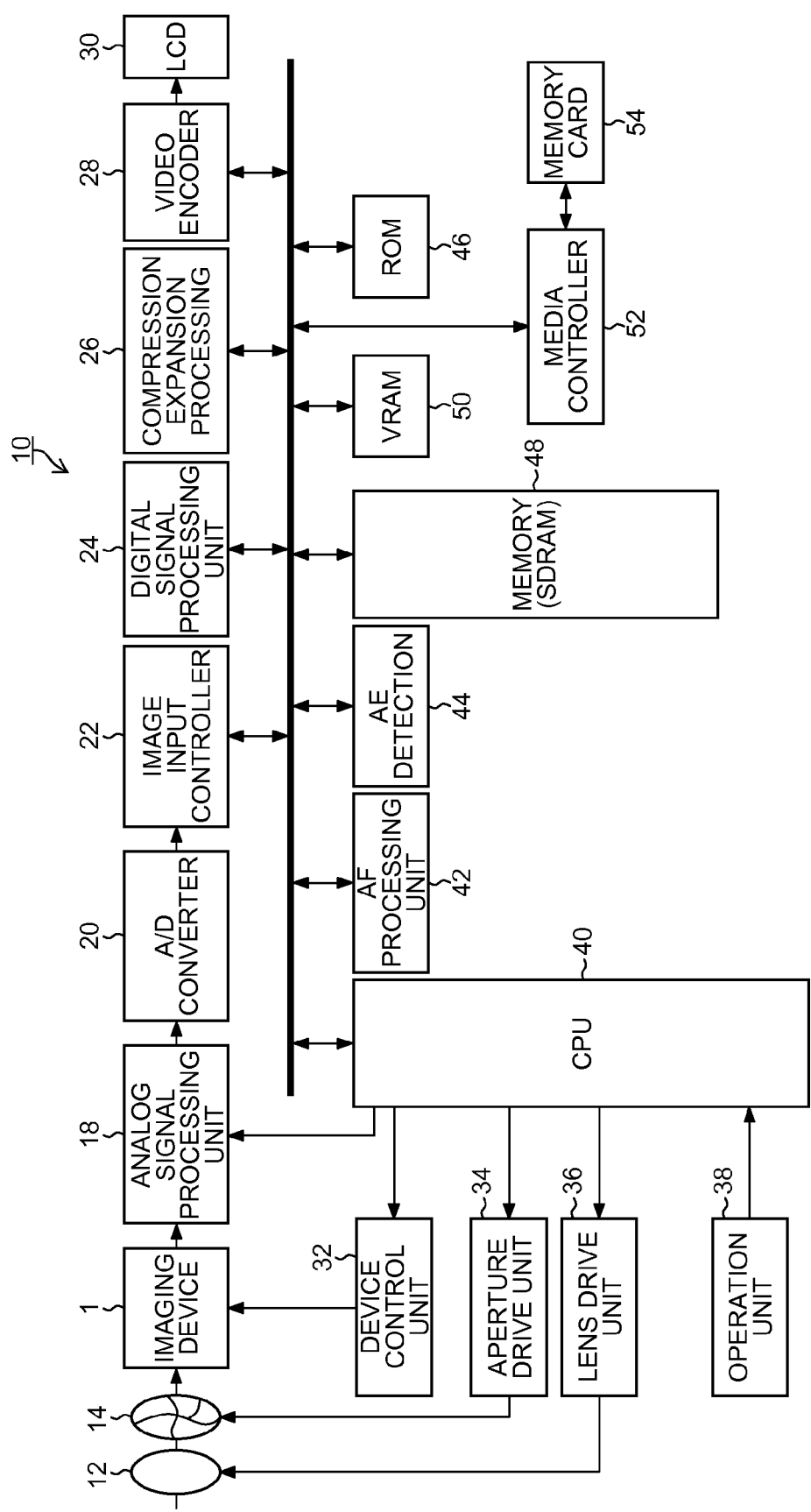
FIG. 4 is a block diagram of an imaging apparatus using the color imaging element of the first embodiment.

As shown in FIG. 4, 2×2 blocks of G filters are extracted to calculate difference absolute values of the pixel values of the G pixels in the horizontal direction, difference absolute values of the pixel values of the G pixels in the vertical direction, and difference absolute values of the pixel values of the G pixels in the oblique directions (upper right oblique and upper left oblique directions). In this way, it can be determined that there is a correlation in the direction with a small difference absolute value among the horizontal, vertical, and oblique directions.

Therefore, according to the color filter array, information of the G pixels at minimum pixel intervals can be used to determine the direction with a high correlation among the horizontal, vertical, and oblique directions. The direction determination result can be used for a process of interpolation (demosaicing processing) based on surrounding pixels.

When the pixels of the A or B array of 3×3 blocks are the target pixels of the demosaicing process, and 5×5 blocks (local area of mosaic image) are extracted around the A or B array, there are G pixels of 2×2 blocks at four corners of the 5×5 blocks. The pixel values of the G pixels of 2×2 blocks can be used to accurately determine the correlation direction of four directions using the information of the G pixels at minimum pixel intervals.

{Feature (6)}

The basic array pattern P1 of the color filter array shown in FIG. 1 is point-symmetric. More specifically, the basic array pattern P1 is point-symmetric with respect to the center of the basic array pattern P1. The A and B arrays in the basic array pattern P1 are also point-symmetric with respect to the G filter at the center. Furthermore, the A and B arrays in the basic array pattern P1 are line symmetric with respect to the line in the horizontal or vertical direction through the centers of the A and B arrays.

The symmetry can reduce and simplify the circuit size of a processing circuit in a later stage.

In the basic array pattern PI shown by a thick frame as shown in FIG. 1, color filter arrays of first and third lines among first to sixth lines in the horizontal direction include GBGGRG, a color filter array of the second line includes RGRBGB, color filter arrays of the fourth and sixth lines include GRGGBG, and a color filter array of the fifth line includes BGBRGR.

In FIG. 1, assuming that a basic array pattern obtained by shifting the basic array pattern PI by one block both in the horizontal and vertical directions is PI' and a basic array pattern obtained by shifting the basic array pattern PI by two blocks both in the horizontal and vertical directions is PI", the color filter array is the same even if the basic array patterns PI' and PI" are repeatedly arranged in the horizontal and vertical directions.

Therefore, there are a plurality of basic array patterns that can form the color filter array shown in FIG. 1 by repeatedly arranging the basic array pattern in the horizontal and vertical directions.

In the first embodiment, the basic array pattern P in which the basic array pattern is point-symmetric is called a basic array pattern for convenience.

Although there are also a plurality of basic array patterns for each of the color filter arrays in the other embodiments described below, the representative one will be called a basic array pattern of the color filter array.

[Imaging Apparatus]

FIG. 4 is a block diagram showing an embodiment of an imaging apparatus 10 according to the present invention.

The imaging apparatus 10 is provided with the color imaging element (imaging device) 1 shown in FIG. 1 and can take a 2D image and a 3D image. A central processing unit (CPU) 40 comprehensively controls the operation of the entire apparatus.

The imaging apparatus 10 includes an operation unit 38, such as a shutter button, a mode dial, a replay button, a MENU/OK key, arrow keys, and a BACK key. A signal from the operation unit 38 is input to the CPU 40. The CPU 40 controls circuits of the imaging apparatus 10 based on the input signal and performs, for example, lens drive control, aperture drive control, imaging operation control, image processing control, recording/replay control of image data, and display control of a liquid crystal monitor 30 for three-dimensional display.

The shutter button is an operation button for inputting an instruction for starting imaging and is provided with two-stage stroke switches including an S1 switch turned on when half-pressed and an S2 switch turned on when full-pressed. The mode dial is a selection device for selecting a 2D imaging mode, a 3D imaging mode, an auto imaging mode, a manual imaging mode, a scene position of a person, a landscape, or a night scene, a macro mode, and a movie mode, as well as a parallax priority imaging mode according to the present invention.

The replay button is a button for switching to a replay mode for displaying still images or moving images of a plurality of taken and recorded parallax images (3D images) and plane images (2D images) on the liquid crystal monitor 30. The MENU/OK key is an operation key having a function of a menu button for commanding to display a menu on the screen of the liquid crystal monitor 30 and a function of an OK button for commanding to confirm and execute the selected content. The arrow keys are an operation unit for inputting instructions of four vertical and horizontal directions, and the arrow keys function as buttons (a cursor movement operation device) for selecting an item from the menu screen or for instructing to select various setting items from each menu. Up and down keys of the arrow keys function as zoom switches in the imaging or as replay zoom switches in the relay mode, and left and right keys function as frame advance (forward direction/ opposite direction advance) buttons in the replay mode. The BACK key is used to delete a desired target of a selected item or the like, to cancel the instructed content, or to restore the previous operation state.

In the imaging mode, an image of image light indicating the object is formed on the light receiving surfaces of the color imaging element 1 through a single imaging optical system (zoom lens) 12 and an aperture 14. The imaging optical system 12 is driven by a lens drive unit 36 controlled by the CPU 40, and focus control, zoom control, and the like are performed. The aperture 14 includes, for example, five aperture blades. An aperture drive unit 34 controlled by the CPU 40 drives the aperture 14, and for example, the aperture 14 is controlled in six stages from aperture value F1.4 to F11 on an AV to AV basis.

The CPU 40 controls the aperture 14 through the aperture drive unit 34 and performs control of electric charge accumulation time (shutter speed) in the color imaging element 1 through a device control unit 32, reading control of an image signal from the color imaging element 1, and the like.

The signal charge accumulated in the color imaging element 1 is read as a voltage signal corresponding to the signal charge based on a read signal added from the device control unit 32. The voltage signal read from the color imaging element 1 is added to an analog signal processing unit 18, and the R, G, and B signals of the pixels are sampled and held here. The signal is amplified by a gain (equivalent to ISO sensitivity) designated from the CPU 40 and then added to an A/D converter 20.

The A/D converter 20 converts the sequentially input R, G, and B signals to digital R, G, and B signals and output the signals to an image input controller 22.

A digital signal processing unit 24 applies signal processing to the digital image signals input through the image input controller 22, such as an offset process, a gain control process including white balance correction and sensitivity correction, a gamma correction process, a demosaicing process, a YC process, and sharpness correction.

In FIG. 4, reference numeral 46 designates a ROM (EEPROM) storing a camera control program, defect information of the color imaging element 1, various parameters and tables used for image processing and the like, an aperture priority program diagram, a shutter speed priority program diagram, and a program diagram (normal program diagram) for alternately or concurrently changing the aperture and the shutter speed according to the brightness of the object, as well as a parallax priority program diagram and the like.

The parallax priority program diagram is designed, for example, to set an F value to a constant value of 5.6 (AV=5) and to change only the shutter speed from 1/60 seconds (TV=6) to 1/2000 (TV=11) according to an imaging EV value when the imaging EV value is from 11 to 16. When the imaging EV value is smaller (darker) than 11, the parallax priority program diagram is designed to change the ISO sensitivity from 100 to 200, 400, 800, 1600, and 3200 every time the imaging EV value is reduced by 1 EV, while the F value=5.6 and the shutter speed=1/60 seconds are fixed. The parallax priority program diagram is not limited to this. Since the parallax of the parallax images from four viewpoints obtained from the color imaging element 1 changes according to the size of the aperture opening, the aperture opening may be controlled to avoid the aperture opening from becoming smaller than a certain aperture opening in the 3D imaging mode.

The digital signal processing unit 24 executes image processing according to one of the 2D imaging mode and the 3D imaging mode and executes image processing according to the object and imaging conditions. Details of the image processing in the digital signal processing unit 24 will be described later.

When the 2D imaging mode is selected, 2D image data processed by the digital signal processing unit 24 is output to a VRAM 50. On the other hand, when the 3D imaging mode is selected, 3D image data processed by the digital signal processing unit 24 is output to the VRAM 50. The VRAM 50 includes an A area and a B area, each storing image data indicating an image of one frame. In the VRAM 50, the image data indicating an image of one frame is alternately rewritten in the A area and the B area. Of the A area and the B area of the VRAM 50, the written image data is read from the area other than the area in which the image data is rewritten. A video encoder 28 encodes the image data read from the VRAM 50, and the image data is output to the liquid crystal monitor 30 for three-dimensional display arranged on the back side of the camera. In this way, a 2D/3D object image (live view image) is displayed on the display screen of the liquid crystal monitor 30.

The liquid crystal monitor 30 is a three-dimensional display device that can display a stereoscopic image (left viewpoint image and right viewpoint image) as a directional image with directivity, through a parallax barrier. The liquid crystal monitor 30 is not limited to this, and a lenticular lens may be used, or the left viewpoint image and the right viewpoint image may be individually viewed by wearing special glasses, such as polarization glasses and liquid crystal shutter glasses.

When there is a press (half-press) of the first stage of the shutter button of the operation unit 38, the color imaging element 1 starts AF operation and AE operation and controls the focus lens in the imaging optical system 12 to come to the focal position through the lens drive unit 36. An AE detection unit 44 imports the image data output from the A/D converter 20 when the shutter button is half-pressed.

The AE detection unit 44 integrates the G signals of the entire screen or integrates the G signals by applying different weights to the screen center and the surrounding. The AE detection unit 44 outputs the integrated value to the CPU 40. The CPU 40 calculates the brightness (imaging EV value) of the object based on the integrated value input from the AE detection unit 44 and determines the aperture value of the aperture 14 and the electronic shutter (shutter speed) of the color imaging element 1 based on the imaging EV value according to a program diagram.

In the program diagram, imaging (exposure) conditions including combinations of the aperture values of aperture and the shutter speed or combinations of these and the imaging sensitivity (ISO sensitivity) are designed according to the brightness of the object, and an image can be taken by the imaging conditions determined according to the program diagram to take an image with appropriate brightness, regardless of the brightness of the object.

The CPU 40 controls the aperture 14 through the aperture drive unit 34 based on the aperture value determined according to the program diagram and controls the electric charge accumulation time in the color imaging element 1 through the device control unit 32 based on the determined shutter speed.

An AF processing unit 42 is a portion that executes contrast AF processing or phase AF processing. In the phase difference AF processing, for example, the phase difference of the image data in the focus detection area of the plurality of parallax image data generated in certain blocks is detected, and the amount of defocus is obtained based on information indicating the phase difference. The AF control is performed by controlling the focus lens in the imaging optical system 12 so that the amount of defocus becomes 0. In the contrast AF processing, high frequency components of the image data in the focus detection area of the image data are extracted, and the high frequency components are integrated to calculate an AF evaluation value indicating the focus state. The AF control is performed by controlling the focus lens in the imaging optical system 12 to maximize the AF evaluation value.

When there is a press (full-press) of the second stage of the shutter button after the AE operation and the AF operation are finished, the image data output from the A/D converter 20 in response to the press is input from the image input controller 22 to a memory (SDRAM) 48 and is temporarily stored.

The digital signal processing unit 24 appropriately reads the image data temporarily stored in the memory 48. Predetermined image processing is applied to the image data, including a demosaicing process (process of converting color signals to a synchronous system by interpolating spatial deviation of the color signals associated with the array of the primary color filters) and a YC process (generation process of luminance data and color difference data of image data). The YC-processed image data (YC data) is stored again in the memory 48.

In the 2D imaging mode, assuming that the pixels of the blocks are A, B, C, and D as shown in FIG. 2, the digital signal processing unit 24 adds four image data of A, B, C, and D for each block to generate image data of one pixel.

Figure 5:
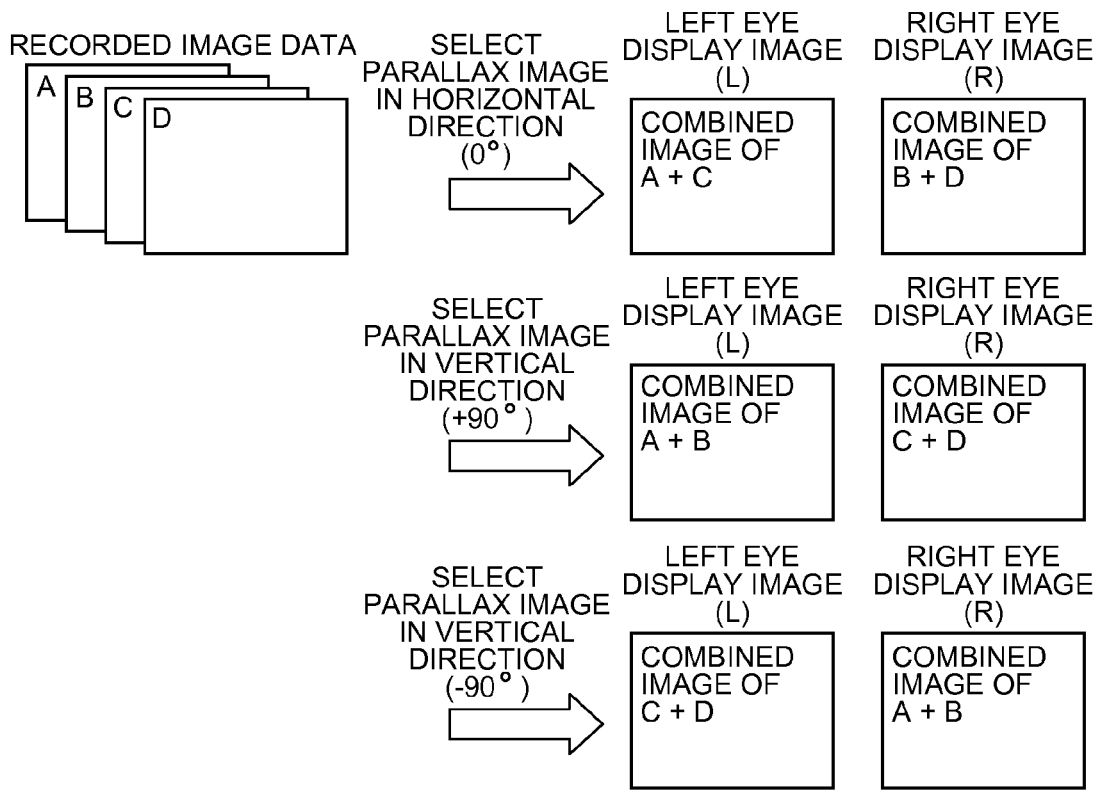
FIG. 5 is a diagram used to explain generation of parallax images.

In the 3D imaging mode, the digital signal processing unit 24 generates four image data of A, B, C, and D. When the imaging apparatus 10 is horizontally set to take an image, the digital signal processing unit 24 adds the image data of A and C to generate a left eye display image (left parallax image) and adds the image data of B and D to generate a right eye display image (right parallax image) as shown in FIG. 5. On the other hand, when the imaging apparatus 10 is vertically set to take an image, the digital signal processing unit 24 adds the image data of A and B to generate a left eye display image (left parallax image) and adds the image data of C and D to generate a right eye display image (right parallax image). The imaging apparatus 10 includes a sensor that detects the posture (vertical and horizontal) of the imaging apparatus 10, and the addition of the pixels is selectively performed based on the posture of the imaging apparatus 10 in the 3D imaging. In this way, a three-dimensional image can be taken regardless of the posture of the imaging apparatus 10. When the imaging apparatus 10 is vertically set to take an image, the digital signal processing unit 24 may add the image data of A and B to generate a right eye display image (right parallax image) and may add the image data of C and D to generate a left eye display image (left parallax image). The array of the photodiodes of the color imaging element 1 is in a square grid shape, and the image data can be easily added in the generation of the parallax images. Therefore, the noise of the parallax images can be reduced.

Subsequently, the digital signal processing unit 24 applies predetermined signal processing including the demosaicing process and the YC process to the image data. The YC-processed YC data is stored again in the memory 48.

The generated YC data of one image stored in the memory 48 is output to a compression expansion processing unit 26, and predetermined compression processing, such as JPEG (joint photographic experts group) is applied here. The YC data is recorded in a memory card 54 through a media controller 52. The YC data of two images (left and right viewpoint images) generated in the 3D imaging mode and stored in the memory 48 is output to the compression expansion processing unit 26, and compression processing, such as JPEG (joint photographic experts group), is applied here. A multi-picture file (MP file: file in a format of connecting a plurality of images) is further generated, and the MP file is recorded in the memory card 54 through the media controller 52.

Although the left and right two parallax images are generated as shown in FIG. 5 in the 3D imaging mode, the arrangement is not limited to this. The vertical and horizontal four parallax images may be recorded, and the images may be added as shown in FIG. 5 to output parallax images in the 3D replay.

First Modified Example of First Embodiment

In a first modified example of the first embodiment, the number of pixels of the unit block is different from the first embodiment.

Since the color filter array according to the first modified example of the first embodiment is the same as the color filter array of the first embodiment, a color imaging element 1-1 according to the first modified example of the first embodiment has the features (1), (2), (3), (4), (5), and (6) as in the first embodiment. Although the first modified example of the first embodiment will be described below, the same portions as in the first embodiment will not be described, and only portions different from the first embodiment will be described.

[Imaging Device]

Figure 6:
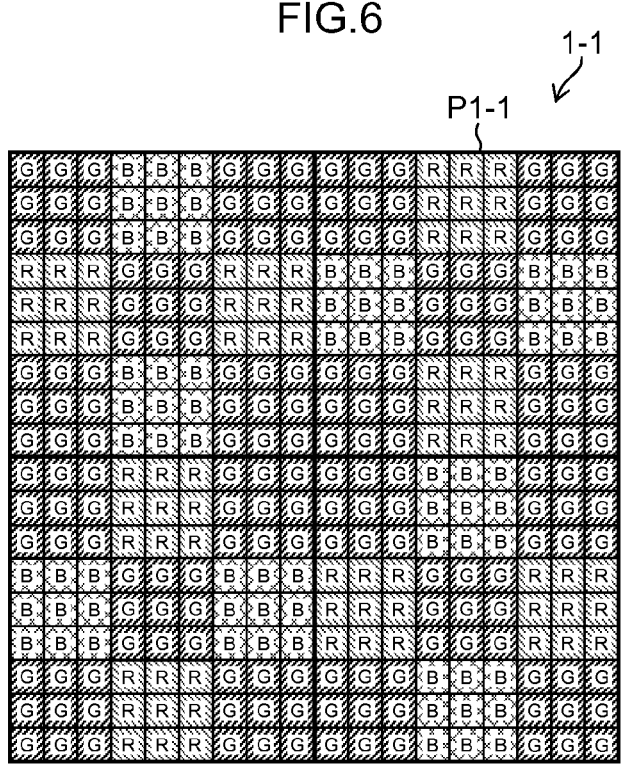
{FIG. 6}

As shown in FIG. 6, the color imaging element 1-1 is an imaging device, such as a CCD and a CMOS, and includes: a plurality of pixels (not shown) with photoelectric conversion elements arranged in the horizontal direction and the vertical direction (two-dimensional arrangement); and color filters of the color filter array shown in FIG. 6 arranged on the light receiving surfaces of the pixels. One of the color filters of three primary colors of red (R), green (G), and blue (B) is arranged on each pixel.

Figure 7:
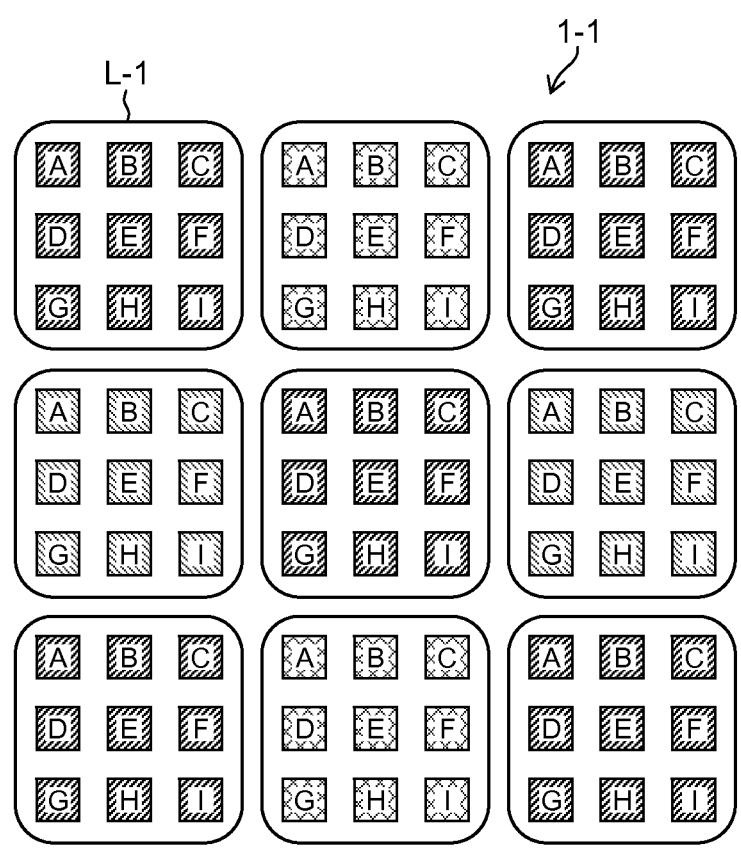
FIG. 7 is a diagram showing a configuration example of light receiving surfaces of the color imaging element according to the first modified example of the first embodiment.

As shown in FIG. 6, color filters of the same color are arranged for nine vertical and horizontal photoelectric conversion elements. As shown in FIG. 7, one microlens L-1 is arranged for the nine photoelectric conversion elements provided with the color filters of the same color. The microlens L-1 collects the light flux on the light receiving surfaces of the nine photoelectric conversion elements, and light with the light flux limited in nine vertical and horizontal directions (pupil-divided light) is incident on the nine photoelectric conversion elements. More specifically, the color imaging element 1-1 can acquire image data from nine viewpoints. Assuming that the pixels of the blocks are A, B, C, D, E, F, G, H, and I as shown in FIG. 7, the pixel E at the center is a pixel that receives the light flux from the front side of an imaging apparatus 10-1 (not shown), and A, B, C, D, F, G, H, and I receive the light flux from other than the front side of the imaging apparatus 10-1.

According to the color imaging element 1-1, a 2D image and a 3D image can be generated based on output signals output from the nine photoelectric conversion elements that receive the light which is pupil-divided by the microlens L-1.

[Imaging Apparatus]

In the 2D imaging mode, a digital signal processing unit 24-1 (not shown) uses only the image data of the E pixel of each block to generate image data of one pixel. Nine image data of A, B, C, D, E, F, G, H, and I may be added for each block to generate image data of one pixel.

In the 3D imaging mode, the digital signal processing unit 24-1 generates nine image data of A, B, C, D, E, F, G, H, and I. When the imaging apparatus 10-1 (not shown) is horizontally set to take an image, the digital signal processing unit 24-1 adds the image data of A, D, and G to generate a left eye display image (left parallax image) and adds the image data of C, F, and I to generate a right eye display image (right parallax image). On the other hand, when the imaging apparatus 10-1 is vertically set to take an image, the digital signal processing unit 24-1 adds the image data of A, B, and C to generate a left eye display image (left parallax image) and adds the image data of G, H, and I to generate a right eye display image (right parallax image). When the imaging apparatus 10-1 is vertically set to take an image, the digital signal processing unit 24-1 may add the image data of A, B, and C to generate a right eye display image (right parallax image) and may add the image data of G, H, and I to generate a left eye display image (left parallax image).

The number of pixels of the unit block is not limited to four or nine, and various modes can be used.

Second Modified Example of First Embodiment

In a second modified example of the first embodiment, the alignment of the photodiodes is different from the first embodiment.

Since the color filter array according to the second modified example of the first embodiment is the same as the color filter array of the first embodiment, a color imaging element 1-2 according to the second modified example of the first embodiment has the features (1), (2), (3), (4), (5), and (6) as in the first embodiment. Although the second modified example of the first embodiment will be described below, the same portions as in the first embodiment will not be described, and only portions different from the first embodiment will be described.

[Imaging Device]

Figure 8:
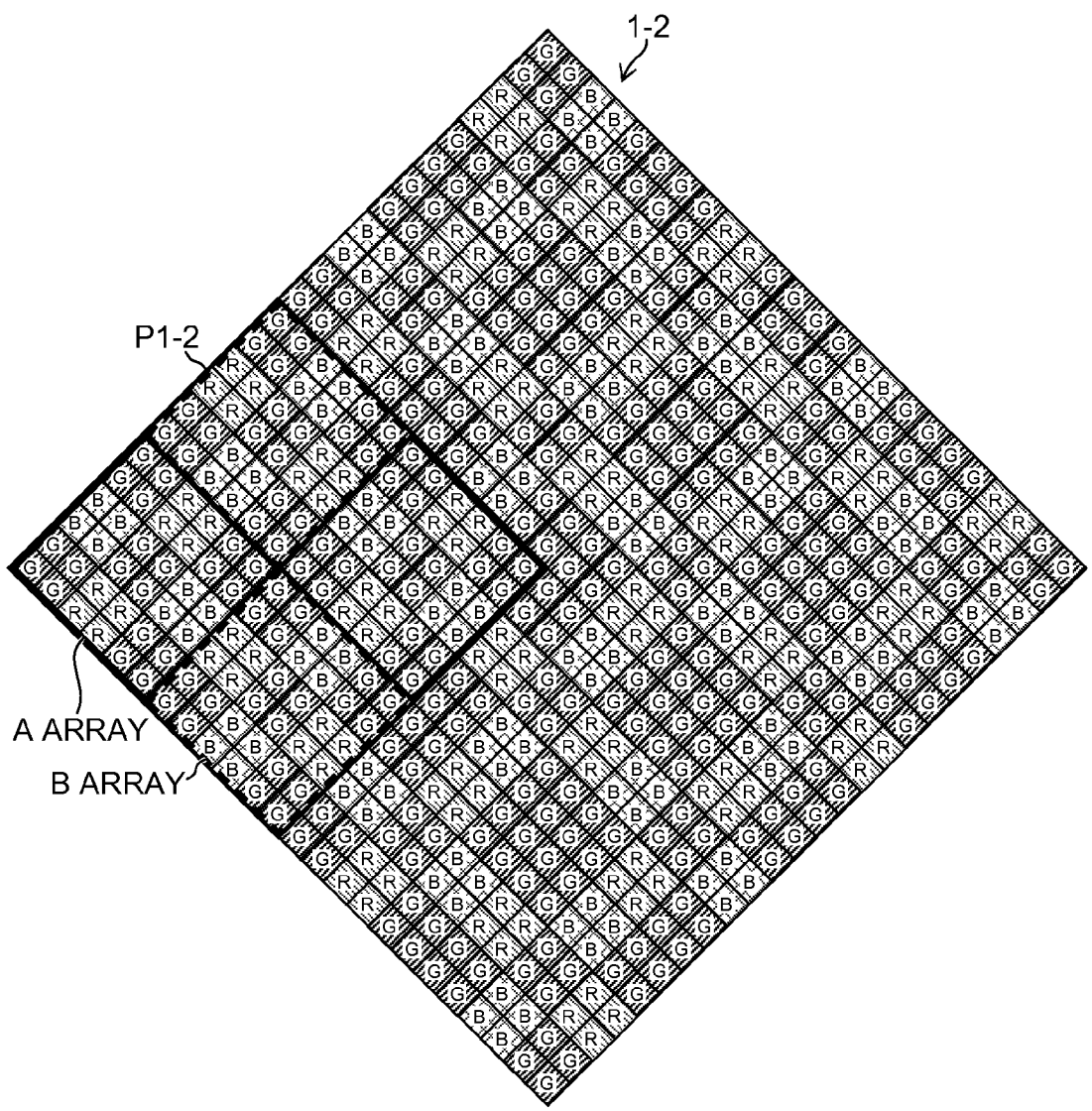
FIG. 8 is a diagram showing a color filter array of a color imaging element according to a second modified example of the first embodiment.

As shown in FIG. 8, the color imaging element 1-2 includes a plurality of photoelectric conversion elements arranged in a diagonal grid shape. More specifically, the centers of adjacent photoelectric conversion elements are shifted at a ½ pixel pitch in the horizontal direction and the vertical direction. In this way, the color imaging element 1-2 corresponds to the color imaging element 1 of FIG. 1 rotated by 45°.

Figure 9:
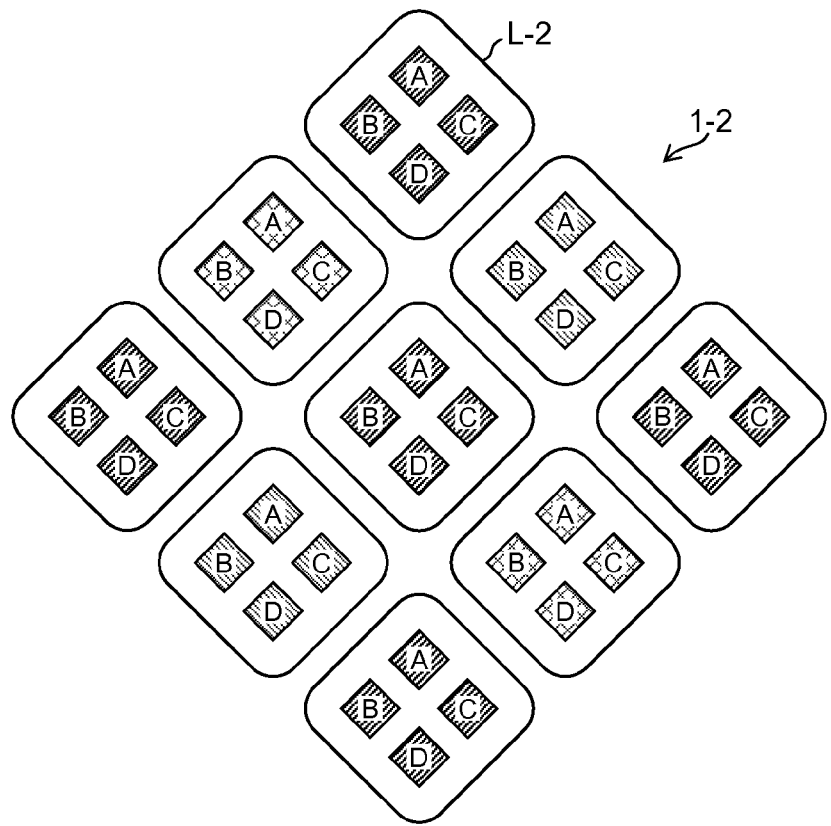
FIG. 9 is a diagram showing a configuration example of the light receiving surfaces of the color imaging element according to the second modified example of the first embodiment.

As shown in FIG. 8, the color imaging element 1-2 is provided with color filters of the same color for four photoelectric conversion elements adjacent in upper right and lower right directions. As shown in FIG. 9, one microlens L-2 is arranged for the four photoelectric conversion elements provided with the color filters of the same color. In the present embodiment, the color filters of the same color arranged for the four photoelectric conversion elements will be described as a unit block.

The microlens L-2 collects the light flux on the light receiving surfaces of the four photoelectric conversion elements, and light with the light flux limited in four vertical and horizontal directions (pupil-divided light) is incident on the four photoelectric conversion elements. More specifically, the color imaging element 1-2 can acquire image data from four viewpoints.

According to the color imaging element 1-2, a 2D image and a 3D image can be generated based on output signals output from the four photoelectric conversion elements that receive the light which is pupil-divided by the microlens L-2. A generation method of the 2D image and the 3D image will be described later.

[Features of Color Filter Array]

{Feature (1)}

The color filter array shown in FIG. 8 includes a basic array pattern P1-2 (pattern indicated by a thick frame) formed by a diagonal grid array pattern corresponding to 6×6 blocks, and the basic array pattern P1-2 is repeatedly arranged in a diagonal grid shape.

{Feature (2)}

Although the color filter array shown in FIG. 8 corresponds to the color filter array of the first embodiment shown in FIG. 1 rotated by 45°, the color filter array shown in FIG. 8 includes G filters arranged in each line in the horizontal, vertical, and oblique (NE, NW) directions of the color filter array as in the color filter array of the first embodiment.

{Feature (3)}

In the basic array pattern P1-2 of the color filter array shown in FIG. 8, the numbers of pixels of the R pixels, the G pixels, and the B pixels corresponding to the R, G, and B filters in the basic array pattern P1-2 are 32 pixels (4 pixels×8 blocks), 80 pixels (4 pixels×20 blocks), and 32 pixels (4 pixels×8 blocks), respectively. Therefore, the ratio of the numbers of pixels of the RGB pixels is 2:5:2, and the proportion of the number of G pixels that most contribute to obtaining the luminance signals is greater than the proportions of the numbers of R and B pixels of other colors.

The proportion of the number of G pixels and the proportions of the numbers of R and B pixels are different, and particularly, the proportion of the number of G pixels that most contribute to obtaining the luminance signals is greater than the proportions of the numbers of R and B pixels, as described above. Therefore, aliasing in the demosaicing process can be suppressed, and high frequency reproducibility can be improved.

{Feature (4)}

In the color filter array of the first embodiment shown in FIG. 1, one or more R and B filters are arranged in each line in the horizontal and vertical directions of the color filter array in the basic array pattern P1. However, since the color filter array according to the second modified example of the first embodiment corresponds to the color filter array of the first embodiment rotated by 45° as shown in FIG. 8, one or more R and B filters are arranged in each line in the oblique (NE, NW) directions of the color filter array in the basic array pattern P1-2.

{Feature (5)}

The A and B arrays are alternately arranged in the diagonal grid shape, and the G filters at four corners of the A and B arrays form G filters of a diagonal grid array corresponding to 2×2 pixels (array in an arrow shape with vertically and horizontally adjacent four pixels).

This is because the G filters as luminance pixels are arranged at the four corners and the center in 3×3 blocks in the A and B arrays, and the 3×3 pixels are arranged in the diagonal grid shape to form the G filters in the diagonal grid array corresponding to 2×2 pixels.

{Feature (6)}

The basic array pattern P1-2 of the color filter array shown in FIG. 8 is point-symmetric. More specifically, the basic array pattern P1-2 is point-symmetric with respect to the center of the basic array pattern P1-2. The A and B arrays in the basic array pattern P1-2 are also point-symmetric with respect to the G filter at the center. Furthermore, the A and B arrays in the basic array pattern P1-2 are line symmetric with respect to the line in the NE or NW direction through the centers of the A and B arrays.

The symmetry can reduce and simplify the circuit size of a processing circuit in a later stage.

In this way, the color imaging element 1-2 according to the second modified example of the first embodiment corresponds to the color imaging element of the first embodiment rotated by 45°. Therefore, the reproducible band in the horizontal and vertical directions is √2 times that of the color imaging element 1 arranged in the square grid shape. The characteristics match with the frequency characteristics of human vision that are higher in the horizontal and vertical directions than in the oblique directions, and this structure is visually advantageous.

[Imaging Apparatus]

In the 2D imaging mode, a digital signal processing unit 24-2 (not shown) adds four image data of A, B, C, and D for each block to generate image data of one pixel.

In the 3D imaging mode, the digital signal processing unit 24-2 generates four image data of A, B, C, and D. When an imaging apparatus 10-2 (not shown) is horizontally set to take an image, the digital signal processing unit 24-2 generates a left eye display image (left parallax image) from the image data of B and generates a right eye display image (right parallax image) from the image data of C. On the other hand, when the imaging apparatus 10-2 is vertically set to take an image, the digital signal processing unit 24-2 generates a left eye display image (left parallax image) from the image data of A and generates a right display image (right parallax image) from the image data of D. When the imaging apparatus 10-2 is vertically set to take an image, the digital signal processing unit 24-2 may generate a left eye display image (left parallax image) from the image data of D and may generate a right eye display image (right parallax image) from the image data of A.

In the color imaging element 1-2 according to the second modified example of the first embodiment, the centers of the adjacent photoelectric conversion elements are shifted at a ½ pixel pitch in the horizontal and vertical directions. Therefore, the parallax in the horizontal direction (interval between A and D) and the parallax in the vertical direction (interval between B and D) of the color imaging element 1-2 are wider than the parallax in the horizontal direction (interval between A and B or between C and D) and the parallax in the vertical direction (interval between A and C or between B and D) of the color imaging element 1 of the first embodiment. Therefore, the parallax of the parallax image is greater, and a more effective parallax image can be taken.

Third Modified Example of First Embodiment

In a first modified example of the first embodiment, the method of pupil division is different from the second modified example of the first embodiment. Although the third modified example of the first embodiment will be described below, the same portions as in the second modified example of the first embodiment will not be described, and only portions different from the second modified example of the first embodiment will be described.

[Imaging Device]

Figure 10:
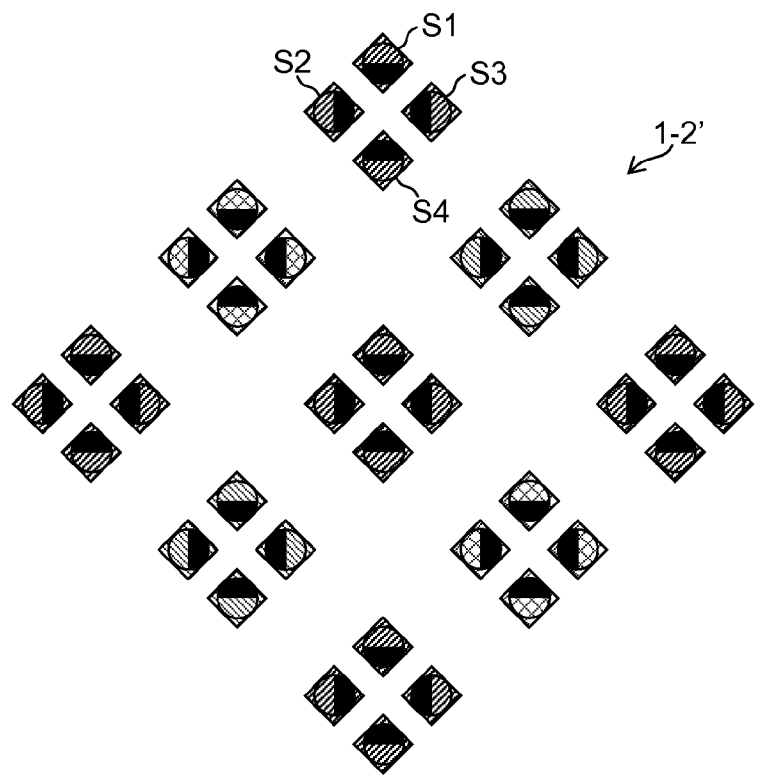
FIG. 10 is a diagram showing a configuration example of light receiving surfaces of a color imaging element according to a third modified example of the first embodiment.

In the second modified example of the first embodiment, one microlens L-2 is arranged for the four photoelectric conversion elements provided with the color filters of the same color as shown in FIG. 9. In the third modified example of the first embodiment, light blocking members S1 to S4 are arranged on the front surfaces of the light receiving surfaces of the four photoelectric conversion elements. As shown in FIG. 10, the light blocking member S1 that blocks substantially the lower half of the light flux is arranged on the pixel corresponding to A of FIG. 9 in a color imaging element 1-2'. The light blocking member S2 that blocks substantially the right half of the light flux is arranged on the pixel corresponding to B of FIG. 9. The light blocking member S3 that blocks substantially the left half of the light flux is arranged on the pixel corresponding to C of FIG. 9. The light blocking member S4 that blocks substantially the upper half of the light flux is arranged on the pixel corresponding to D of FIG. 9. In this way, light with the light flux limited in four vertical and horizontal directions (pupil-divided light) is incident on the four photoelectric conversion elements provided with the color filters of the same color. More specifically, the color imaging element 1-2 can acquire image data from four viewpoints.

Second Embodiment

In a single-plate color imaging element according to a second embodiment of the present invention, only the color filter array of the color filters arranged on the color imaging element is different from the single-plate color imaging element according to the first embodiment. Although the second embodiment will be described below, the same portions as in the first embodiment will not be described, and only the color filter array different from the first embodiment will be described.

[Features of Color Filter Array]

Figures 11, 12:
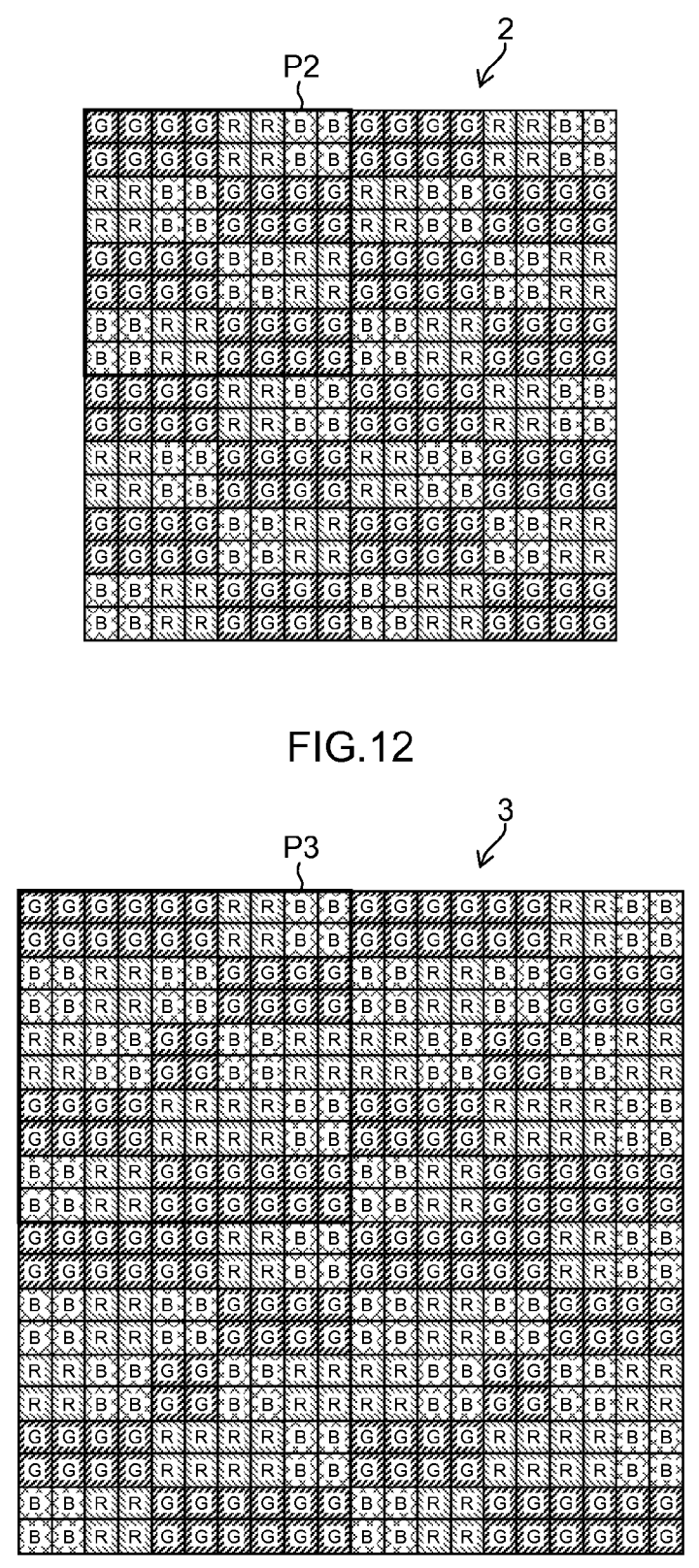

FIG. 11 is a diagram showing the second embodiment of the single-plate color imaging element according to the present invention, and FIG. 11 particularly illustrates a color filter array of color filters arranged on a color imaging element 2. The color filter array of the color imaging element of the second embodiment has the following features (1), (2), (3), (4), and (6).

{Feature (1)}

The color filter array of the color imaging element 2 includes a basic array pattern P2 (pattern indicated by a thick frame) formed by a square array pattern corresponding to 4×4 blocks, and the basic array pattern P2 is repeatedly arranged in the horizontal and vertical directions.

{Feature (2)}

In the color filter array shown in FIG. 11, G filters are arranged in each line in the horizontal, vertical, and oblique (NE, NW) directions of the color filter array as in the first embodiment.

{Feature (3)}

In the basic array pattern P2 of the color filter array shown in FIG. 11, the numbers of pixels of the R pixels, the G pixels, and the B pixels corresponding to the R, G, and B filters in the basic array pattern are 16 pixels (4 blocks×4 pixels), 32 pixels (8 blocks×4 pixels), and 16 pixels (4 blocks×4 pixels), respectively. Therefore, the ratio of the numbers of pixels of the RGB pixels is 1:2:1, and the proportion of the number of G pixels that most contribute to obtaining the luminance signals is greater than the proportions of the numbers of R and B pixels of other colors.

{Feature (4)}

In the color filter array shown in FIG. 11, the R and B filters are arranged in each line in the horizontal and vertical directions of the color filter array as in the first embodiment.

{Feature (6)}

The basic array pattern P2 shown in FIG. 11 is point-symmetric with respect to the center of the basic array pattern P2.

The color filter array shown in FIG. 11 does not include a square array corresponding to 2×2 blocks of G filters. (Therefore, feature (5) is not satisfied. The same applies hereinafter.) However, the color filter array shown in FIG. 11 includes G filters adjacent in the horizontal direction and G filters adjacent in the oblique (NE, NW) directions. Since the G filters exist across the R filters or the B filters in the vertical direction, the pixel values of the G pixels corresponding to the G filters can be used to determine the correlation in the vertical direction.

Third Embodiment

In a single-plate color imaging element according to a third embodiment of the present invention, only the color filter array of the color filters arranged on the color imaging element is different from the single-plate color imaging element according to the first embodiment. Although the third embodiment will be described below, the same portions as in the first embodiment will not be described, and only the color filter array different from the first embodiment will be described.

[Features of Color Filter Array]

FIG. 12 is a diagram showing the third embodiment of the single-plate color imaging element according to the present invention, and FIG. 12 particularly illustrates a color filter array of color filters arranged on a color imaging element 3. The color filter array of the color imaging element of the third embodiment has the following features (1), (2), (3) and (4).

{Feature (1)}

The color filter array of the color imaging element 3 includes a basic array pattern P3 (pattern indicated by a thick frame) formed by a square array pattern corresponding to 5×5 blocks, and the basic array pattern P3 is repeatedly arranged in the horizontal and vertical directions.

{Feature (2)}

In the color filter array shown in FIG. 12, G filters are arranged in each line in the horizontal, vertical, and oblique (NE, NW) directions of the color filter array as in the first embodiment.

{Feature (3)}

In the basic array pattern P3 of the color filter array shown in FIG. 12, the numbers of pixels of the R pixels, the G pixels, and the B pixels corresponding to the R, G, and B filters in the basic array pattern P3 are 28 pixels (7 blocks×4 pixels), 44 pixels (11 blocks×4 pixels), and 28 pixels (7 blocks×4 pixels), respectively. Therefore, the ratio of the numbers of pixels of the RGB pixels is 7:11:7, and the proportion of the number of G pixels that most contribute to obtaining the luminance signals is greater than the proportions of the numbers of R and B pixels of other colors.

{Feature (4)}

In the color filter array shown in FIG. 12, the R and B filters are arranged in each line in the horizontal and vertical directions of the color filter array as in the first embodiment.

The color filter array shown in FIG. 12 does not include a square array corresponding to 2×2 blocks of G filters. The basic array pattern P3 is not point-symmetric. (Therefore, feature (6) is not satisfied. The same applies hereinafter.)

Fourth Embodiment

In a single-plate color imaging element according to a fourth embodiment of the present invention, only the color filter array of the color filters arranged on the color imaging element is different from the single-plate color imaging element according to the first embodiment. Although the fourth embodiment will be described below, the same portions as in the first embodiment will not be described, and only the color filter array different from the first embodiment will be described.

[Features of Color Filter Array]

Figures 13, 14:
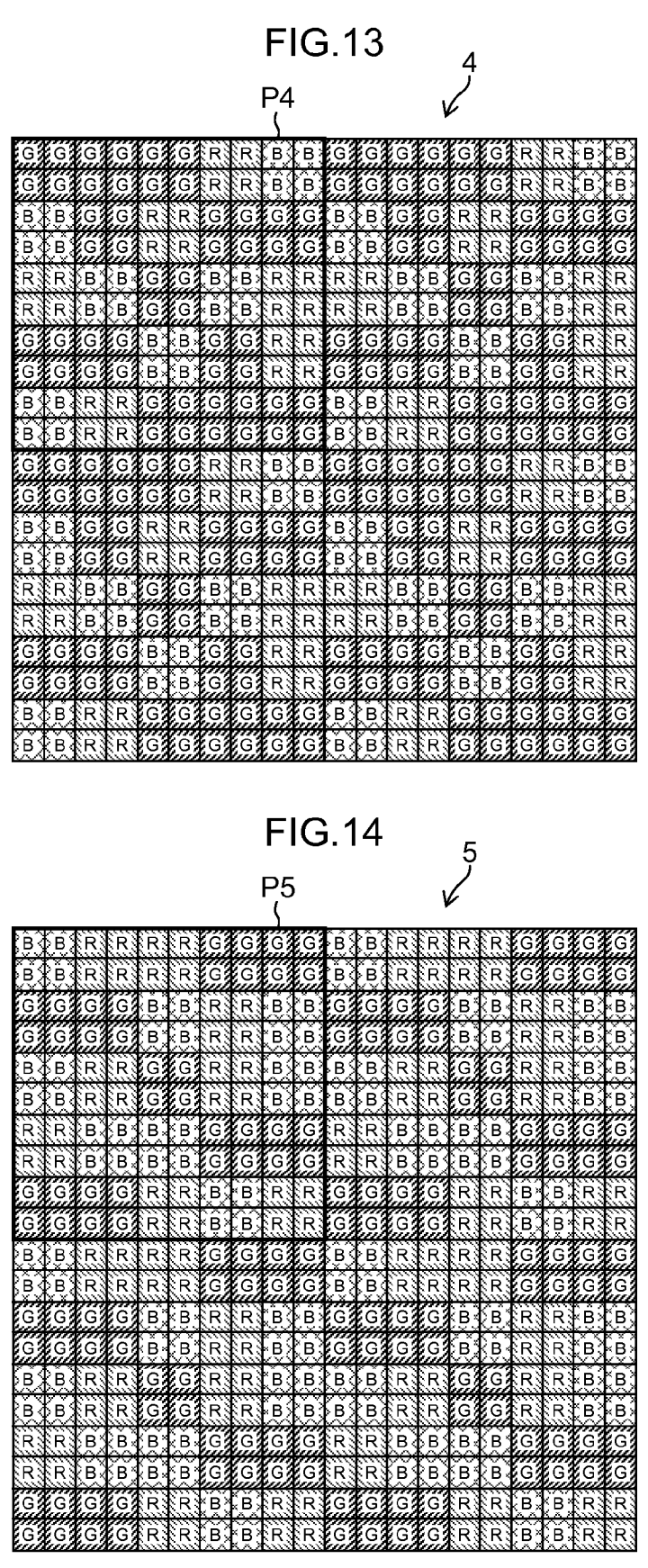

FIG. 13 is a diagram showing the fourth embodiment of the single-plate color imaging element according to the present invention, and FIG. 13 particularly illustrates a color filter array of color filters arranged on a color imaging element 4. The color filter array of the color imaging element of the fourth embodiment has the following features (1), (2), (3) and (4).

{Feature (1)}

The color filter array of the color imaging element 4 includes a basic array pattern P4 (pattern indicated by a thick frame) formed by a square array pattern corresponding to 5×5 blocks as in the third embodiment, and the basic array pattern P4 is repeatedly arranged in the horizontal and vertical directions.

{Feature (2)}

In the color filter array shown in FIG. 13, G filters are arranged in each line in the horizontal, vertical, and oblique (NE, NW) directions of the color filter array as in the first embodiment.

{Feature (3)}

In the basic array pattern P4 of the color filter array shown in FIG. 13, the numbers of pixels of the R pixels, the G pixels, and the B pixels corresponding to the R, G, and B filters in the basic array pattern P4 are 24 pixels (6 blocks×4 pixels), 52 pixels (13 blocks×4 pixels), and 24 pixels (6 blocks×4 pixels), respectively. Therefore, the ratio of the numbers of pixels of the RGB pixels is 6:13:6, and the proportion of the number of G pixels that most contribute to obtaining the luminance signals is greater than the proportions of the numbers of R and B pixels of other colors.

{Feature (4)}

In the color filter array shown in FIG. 13, the R and B filters are arranged in each line in the horizontal and vertical directions of the color filter array.

Although the color filter array shown in FIG. 13 does not include a square array corresponding to 2×2 pixels of G filters, the color filter array includes a set of four blocks with G filters adjacent to each other. The correlation in the horizontal, vertical, and oblique (NE, NW) directions can be determined at minimum pixel intervals based on the pixel values of the four blocks. The basic array pattern P4 is not point-symmetric.

Fifth Embodiment

In a single-plate color imaging element according to a fifth embodiment of the present invention, only the color filter array of the color filters arranged on the color imaging element is different from the single-plate color imaging element according to the first embodiment. Although the fifth embodiment will be described below, the same portions as in the first embodiment will not be described, and only the color filter array different from the first embodiment will be described.

[Features of Color Filter Array]

FIG. 14 is a diagram showing the fifth embodiment of the single-plate color imaging element according to the present invention, and FIG. 14 particularly illustrates a color filter array of color filters arranged on a color imaging element 5. The color filter array of the color imaging element of the fifth embodiment has the following features (1), (2), (3) and (4).

{Feature (1)}

The color filter array of the color imaging element 5 includes a basic array pattern P5 (pattern indicated by a thick frame) formed by a square array pattern corresponding to 5×5 blocks as in the third embodiment, and the basic array pattern P5 is repeatedly arranged in the horizontal and vertical directions.

{Feature (2)}

In the color filter array shown in FIG. 14, G filters are arranged in each line in the horizontal, vertical, and oblique (NE, NW) directions of the color filter array.

{Feature (3)}

In the basic array pattern P5 of the color filter array shown in FIG. 14, the numbers of pixels of the R pixels, the G pixels, and the B pixels corresponding to the R, G, and B filters in the basic array pattern P5 are 32 pixels (8 blocks×4 pixels), 36 pixels (9 blocks×4 pixels), and 32 pixels (8 blocks×4 pixels), respectively. Therefore, the ratio of the numbers of pixels of the RGB pixels is 8:9:8, and the proportion of the number of G pixels that most contribute to obtaining the luminance signals is greater than the proportions of the numbers of R and B pixels of other colors.

{Feature (4)}

In the color filter array shown in FIG. 14, the R and B filters are arranged in each line in the horizontal and vertical directions of the color filter array.

In the color filter array shown in FIG. 14, the R and B filters are further arranged in each line in the oblique directions (NE, NW) of the color filter array.

Therefore, the color filter array includes all R, G, and B filters arranged in each line in the horizontal, vertical, and oblique (NE, NW) directions of the color filter array. As a result, the color reproducibility in the oblique directions can be further improved, and this is a feature not included in the color filter array of the color imaging element of the first embodiment.

The color filter array shown in FIG. 14 does not include a square array corresponding to 2×2 blocks of G filters. The basic array pattern P5 is not point-symmetric.

Sixth Embodiment

In a single-plate color imaging element according to a sixth embodiment of the present invention, only the color filter array of the color filters arranged on the color imaging element is different from the single-plate color imaging element according to the first embodiment. Although the sixth embodiment will be described below, the same portions as in the first embodiment will not be described, and only the color filter array different from the first embodiment will be described.

[Features of Color Filter Array]

Figure 15:
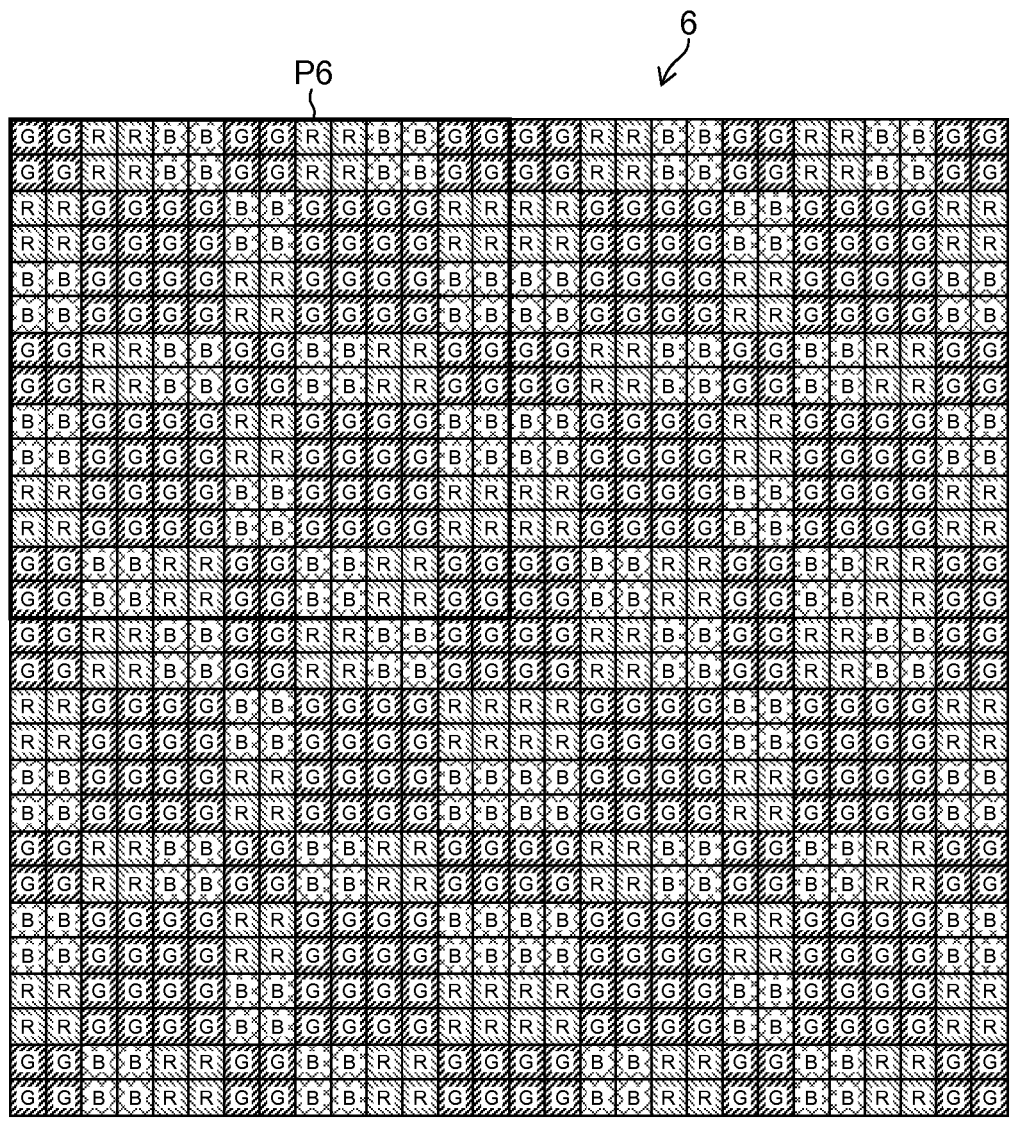
FIG. 15 is a diagram showing a sixth embodiment of the single-plate color imaging element according to the present invention.

FIG. 15 is a diagram showing the sixth embodiment of the single-plate color imaging element according to the present invention, and FIG. 15 particularly illustrates a color filter array of color filters arranged on a color imaging element 6. The color filter array of the color imaging element of the sixth embodiment has the following features (1), (2), (3), (4), (5), and (6).

{Feature (1)}

The color filter array of the color imaging element 6 includes a basic array pattern P6 (pattern indicated by a thick frame) formed by a square array pattern corresponding to 7×7 blocks, and the basic array pattern P6 is repeatedly arranged in the horizontal and vertical directions.

{Feature (2)}

In the color filter array shown in FIG. 15, G filters are arranged in each line in the horizontal, vertical, and oblique (NE, NW) directions of the color filter array as in the first embodiment.

{Feature (3)}

In the basic array pattern P6 of the color filter array shown in FIG. 15, the numbers of pixels of the R pixels, the G pixels, and the B pixels corresponding to the R, G, and B filters in the basic array pattern P6 are 48 pixels (12 blocks×4 pixels), 100 pixels (25 blocks×4 pixels), and 48 pixels (12 blocks×4 pixels), respectively. Therefore, the ratio of the numbers of pixels of the RGB pixels is 12:25:12, and the proportion of the number of G pixels that most contribute to obtaining the luminance signals is greater than the proportions of the numbers of R and B pixels of other colors.

{Feature (4)}

In the color filter array shown in FIG. 15, the R and B filters are arranged in each line in the horizontal and vertical directions of the color filter array.

{Feature (5)}

The color filter array shown in FIG. 15 includes a square array corresponding to 2×2 blocks of G filters.

{Feature (6)}

The basic array pattern P6 shown in FIG. 15 is point-symmetric with respect to the center of the basic array pattern P6.

Seventh Embodiment

In a single-plate color imaging element according to a seventh embodiment of the present invention, only the color filter array of the color filters arranged on the color imaging element is different from the single-plate color imaging element according to the first embodiment. Although the seventh embodiment will be described below, the same portions as in the first embodiment will not be described, and only the color filter array different from the first embodiment will be described.

[Features of Color Filter Array]

Figure 16:
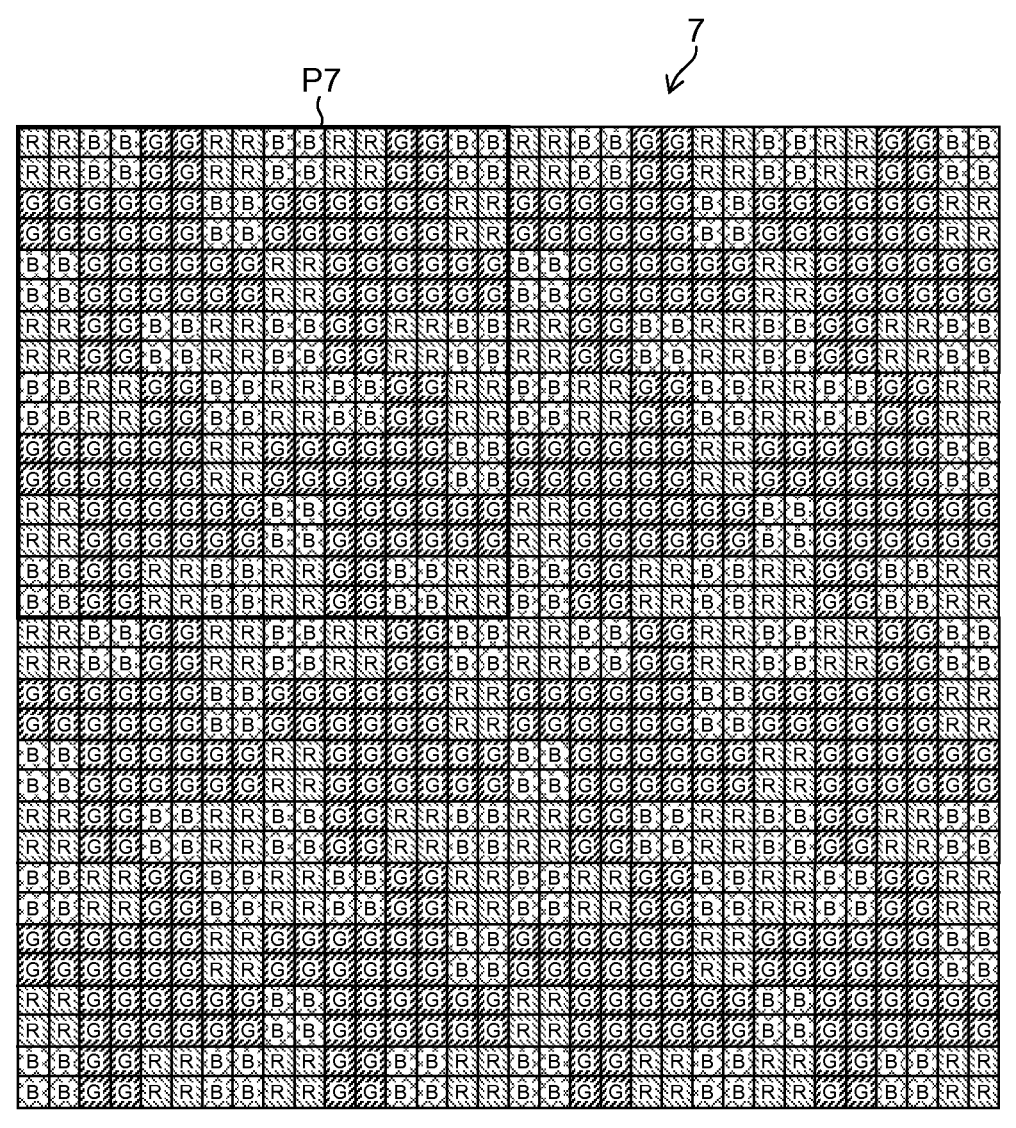

FIG. 16 is a diagram showing the seventh embodiment of the single-plate color imaging element according to the present invention, and FIG. 16 particularly illustrates a color filter array of color filters arranged on a color imaging element 7. The color filter array of the color imaging element of the seventh embodiment has the following features (1), (2), (3), (4), (5), and (6).

{Feature (1)}

The color filter array of the color imaging element 7 includes a basic array pattern P7 (pattern indicated by a thick frame) formed by a square array pattern corresponding to 8×8 blocks, and the basic array pattern P7 is repeatedly arranged in the horizontal and vertical directions.

When the basic array pattern is divided into four sets of 4×4 blocks, the diagonal arrays of 4×4 pixels are the same, and the positional relationship between the R and B filters is opposite in the arrays of 4×4 blocks adjacent in the horizontal or vertical direction. The rest of the arrangement is the same.

{Feature (2)}

In the color filter array shown in FIG. 16, G filters are arranged in each line in the horizontal, vertical, and oblique (NE, NW) directions of the color filter array, as in the first embodiment.

{Feature (3)}

In the basic array pattern P7 of the color filter array shown in FIG. 16, the numbers of pixels of the R pixels, the G pixels, and the B pixels corresponding to the R, G, and B filters in the basic array pattern P7 are 64 pixels (16 blocks×4 pixels), 128 pixels (32 blocks×4 pixels), and 64 pixels (16 blocks×4 pixels), respectively. Therefore, the ratio of the numbers of pixels of the RGB pixels is 1:2:1, and the proportion of the number of G pixels that most contribute to obtaining the luminance signals is greater than the proportions of the numbers of R and B pixels of other colors.

{Feature (4)}

In the color filter array shown in FIG. 16, the R and B filters are arranged in each line in the horizontal and vertical directions of the color filter array.

{Feature (5)}

The color filter array shown in FIG. 16 includes a square array corresponding to 2×2 blocks of G filters.

{Feature (6)}

The basic array pattern P7 shown in FIG. 16 is point-symmetric with respect to the center of the basic array pattern P7.

Eighth Embodiment

The color filter arrays of the color imaging element of the first to seventh embodiments are color filter arrays of color filters of three primary colors of RGB. The color filter array of the color imaging element of the eighth embodiment is different in that the array is a color filter array of four color filters including E filters of emerald (E) in addition to the RGB filters.

Although a single-plate color imaging element 8 according to an eighth embodiment will be described below, the same portions as in the first to seventh embodiments will not be described, and only the difference from the first to seventh embodiments will be described.

[Features of Color Filter Array]

Figure 17:
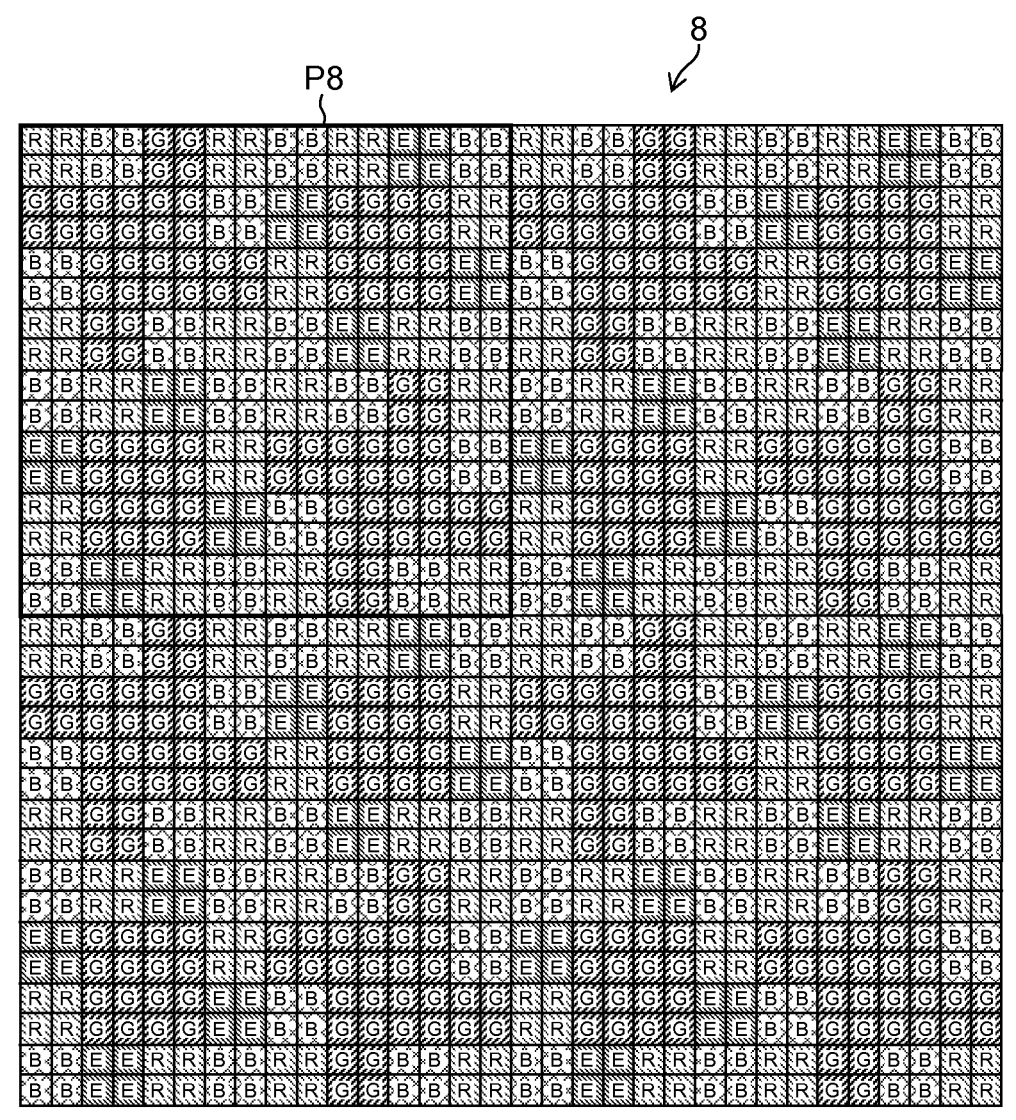

FIG. 17 is a diagram showing the eighth embodiment of the single-plate color imaging element according to the present invention, and FIG. 17 particularly illustrates a color filter array of color filters arranged on the color imaging element 8. The color filter array of the color imaging element of the eighth embodiment has the following features (1), (2), (3), (4), (5), and (6).

{Feature (1)}

The color filter array of the color imaging element 8 includes a basic array pattern P8 (pattern indicated by a thick frame) formed by a square array pattern corresponding to 8×8 blocks as in the seventh embodiment, and the basic array pattern P8 is repeatedly arranged in the horizontal and vertical directions.

{Feature (2)}

In the color filter array shown in FIG. 17, G filters are arranged in each line in the horizontal, vertical, and oblique (NE, NW) directions of the color filter array.

{Feature (3)}

In the basic array pattern P8 of the color filter array shown in FIG. 17, the numbers of pixels of the R pixels, the G pixels, the B pixels, and the E pixels corresponding to the R, G, B, and E filters in the basic array pattern P8 are 64 pixels (16 blocks×4 pixels), 96 pixels (24 blocks×4 pixels), 64 pixels (16 blocks×4 pixels), and 32 pixels (8 blocks×4 pixels), respectively.

Therefore, the ratio of the numbers of pixels of the RGBE pixels is 2:3:2:1, and the proportion of the number of G pixels that most contribute to obtaining the luminance signals is greater than the proportions of the numbers of R, B, and E pixels of other colors.

{Feature (4)}

In the color filter array shown in FIG. 17, the R, B, and E filters are arranged in each line in the horizontal and vertical directions of the color filter array.

{Feature (5)}

The color filter array shown in FIG. 17 includes a square array corresponding to 2×2 blocks of G filters.

{Feature (6)}

The basic array pattern P8 is point-symmetric with respect to the center of the basic array pattern P8.

Although the examples of the basic array patterns of 5×5 blocks to 8×8 blocks have been described in the embodiments, the number of unit blocks forming the basic array pattern is not limited to these. However, assuming that the basic array pattern is formed by N×N unit blocks, it is desirable that N is equal to or smaller than 10 in consideration of the ease of image processing, such as a demosaicing process and a thinning-out process in video imaging. It is further desirable that N is 4 or more and 8 or less in consideration of the ease of the arrangement of the color filters. This is because if N is smaller than 4, conditions of the color filter array according to the present invention are not satisfied. If N exceeds 8, signal processing such as demosaicing becomes complicated, and an advantageous effect cannot be particularly obtained by increasing the size of the basic array pattern. It is most desirable that N is 6 as shown in the first embodiment.

Modified Example

Although the example of adopting green (G) as a first color and adopting red (R) and blue (B) as second colors has been described in the embodiments, the colors that can be used in the color filters are not limited to these colors, and color filters corresponding to colors satisfying the following conditions can also be used.

<Conditions of First Filter (First Color)>

Although the example that the G filters of G color serve as the first filters in the first color of the present invention has been described in the embodiments, filters satisfying one of the following conditions (1) to (4) may be used in place of the G filters or in place of part of the G filters.

{Condition (1)}

The condition (1) is that the contribution ratio for obtaining the luminance signals is equal to or greater than 50%. The contribution ratio 50% is a value that is set to make a distinction between the first color (such as G color) and the second color (such as R and B colors) of the present invention and is a value that is set so that a color with the contribution ratio for obtaining the luminance data higher than that of the R color, B color, and the like is included in the "first color".

A color with the contribution ratio lower than 50% is a second color (such as R and B colors) of the present invention, and a filter in this color is the second filter of the present invention.

{Condition (2)}

The condition (2) is that the peak of the transmittance of the filter is in a range of wavelength 480 nm or more and 570 nm or less. A value measured by, for example, a spectrophotometer is used as the transmittance of the filter. The wavelength range is a range that is set to make a distinction between the first color (such as G color) and the second color (such as R and B colors) of the present invention and is a range that is set so that the peak of the R color, the B color, or the like with a relatively low contribution ratio is not included and the peak of the G color or the like with a relatively high contribution ratio is included. Therefore, a filter with the peak of the transmittance in the range of wavelength 480 nm or more and 570 or less can be used as a first filter. A filter with the peak of the transmittance out of the range of wavelength 480 nm or more and 570 or less is a second filter (R filter, B filter) of the present invention.

{Condition (3)}

The condition (3) is that the transmittance in a range of wavelength 500 nm or more and 560 or less is higher than the transmittance of the second filter (R filter or B filter). A value measured by, for example, a spectrophotometer is also used as the transmittance of the filter in the condition (3). The wavelength range of the condition (3) is also a range that is set to make a distinction between the first color (such as G color) and the second color (such as R and B colors) of the present invention and is a range that the transmittance of the filter in a color with the contribution ratio relatively higher than the R color, the B color, and the like is higher than the transmittance of the RB filters and the like. Therefore, a filter with a relatively high transmittance in the range of wavelength 500 nm or more and 560 nm or less can be used as a first filter, and a filter with a relatively low transmittance can be used as a second filter.

{Condition (4)}

The condition (4) is that filters of two or more colors including a color that most contributes to the luminance signals among the three primary colors (for example, G color of RGB) and including a color different from the three primary colors are used as first filters. In this case, a filter corresponding to a color other than the colors of the first filters is a second filter.

<A Plurality of Types of First Filters (G Filters)>

Therefore, the G filters of G color as the first filters are not limited to one type, and for example, a plurality of types of G filters (G1 filters, G2 filters) can be used as the first filters. More specifically, the G filters of the color filters (basic array pattern) according to the embodiments may be appropriately replaced by the G1 filters or the G2 filters. The G1 filters transmit G light of a first wavelength band, and the G2 filters transmit G light of a second wavelength band highly correlated with the G1 filters (see FIG. 18).

Existing G filters (for example, the G filters of the first embodiment) can be used as the G1 filters. Filters highly correlated with the G1 filters can be used as the G2 filters. In this case, it is desirable that the peak value of the spectral sensitivity curve of the light receiving elements provided with the G2 filters is, for example, in a range of wavelength 500 nm to 535 nm (near the peak value of the spectral sensitivity curve of the light receiving elements provided with the existing G filters). A method described for example in Japanese Patent Application Laid-Open No. 2003-284084 is used as a method of determining the color filters of four colors (R, G1, G2, B).

In this way, the color imaging element acquires four types of colors in the image, and color information to be acquired is increased. As a result, colors can be more accurately expressed compared to when only three types of colors (RGB) are acquired. More specifically, visually different colors can be reproduced as different colors, and visually same colors can be reproduced as same colors ("color determination" can be improved).

Since the transmittance of the G1 and G2 filters is basically the same as the transmittance of the G filters of the first embodiment, the contribution ratio for obtaining the luminance signals is higher than 50%. Therefore, the G1 and G2 filters satisfy the condition (1).

Figure 18:
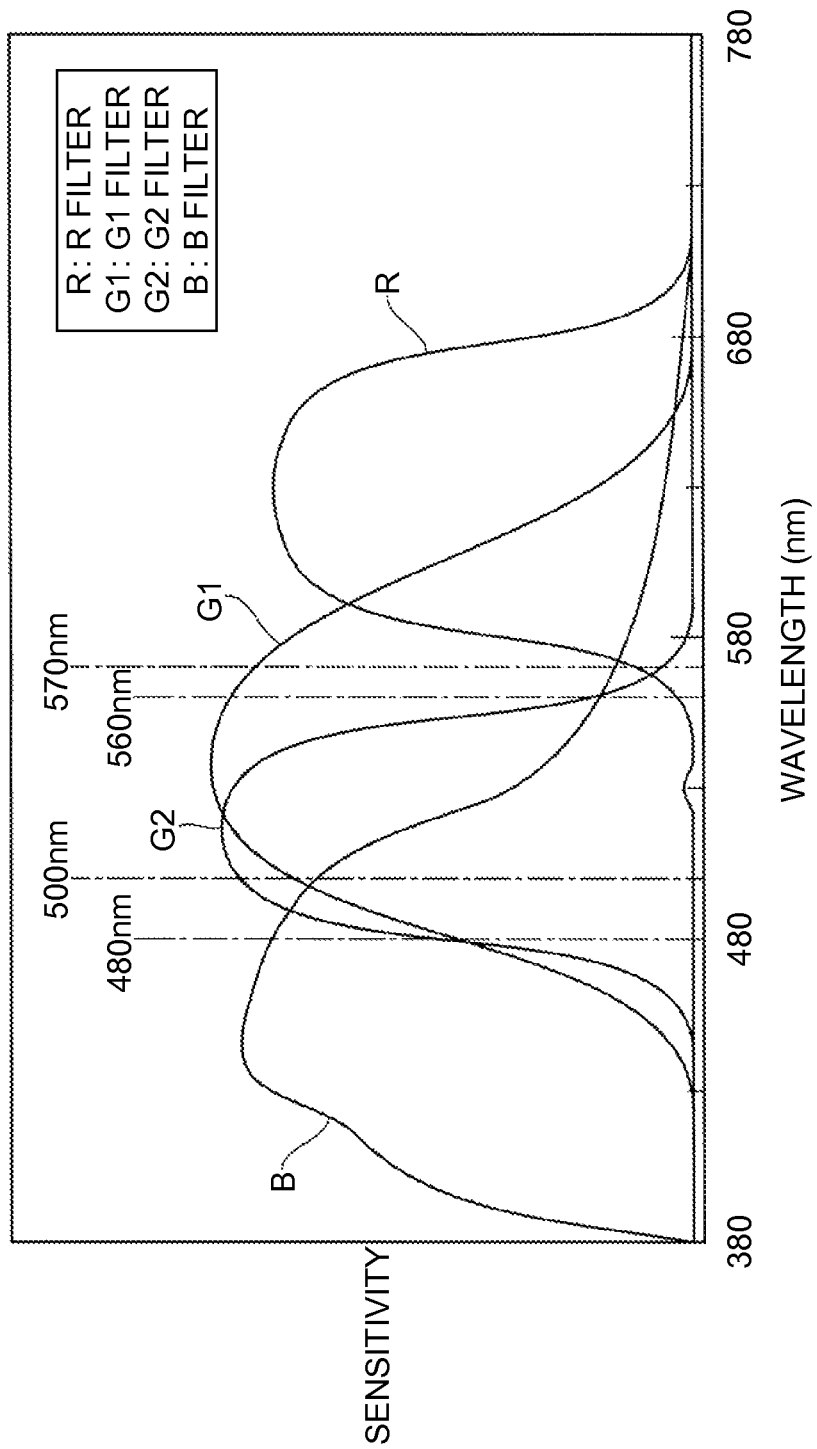
FIG. 18 is a graph showing spectral sensitivity characteristics of a light receiving element provided with an R filter (red filter), a G1 filter (first green filter), a G2 filter (a second green filter), and a B filter (blue filter).

In FIG. 18 showing the spectral sensitivity characteristics of the color filter array (light receiving elements), the peak of the transmittance of the G1 and G2 filters (peak of the sensitivity of the G pixels) is in the range of wavelength 480 nm or more and 570 nm or less. The transmittance of the G1 and G2 filters is in the range of wavelength 500 nm or more and 560 nm or less and is higher than the transmittance of the RB filters. Therefore, the G1 and G2 filters also satisfy the conditions (2) and (3).

The arrangement and the number of G1 and G2 filters may be appropriately changed. The types of the G filters may be increased to three or more types.

<Transparent Filters (W Filters)>

Although the embodiments mainly illustrate color filters made of color filters corresponding to RGB colors, part of the color filters may be transparent filters W (white pixels). Particularly, it is preferable to arrange the transparent filters W in place of part of the first filters (G filters). The replacement of part of the G pixels with the while pixels can suppress the degradation in the color reproducibility even if the pixel size is miniaturized.

The transparent filters W are filters of a transparent color (first color). The transparent filters W are filters that can transmit light corresponding to a wavelength band of visible light, and for example, whose transmittance of light of the RGB colors is 50% or more. Since the transmittance of the transparent filters W is higher than that of the G filters, the contribution ratio for obtaining the luminance signals is also higher than that of the G color (60%), and the condition (1) is satisfied.

Figure 19:
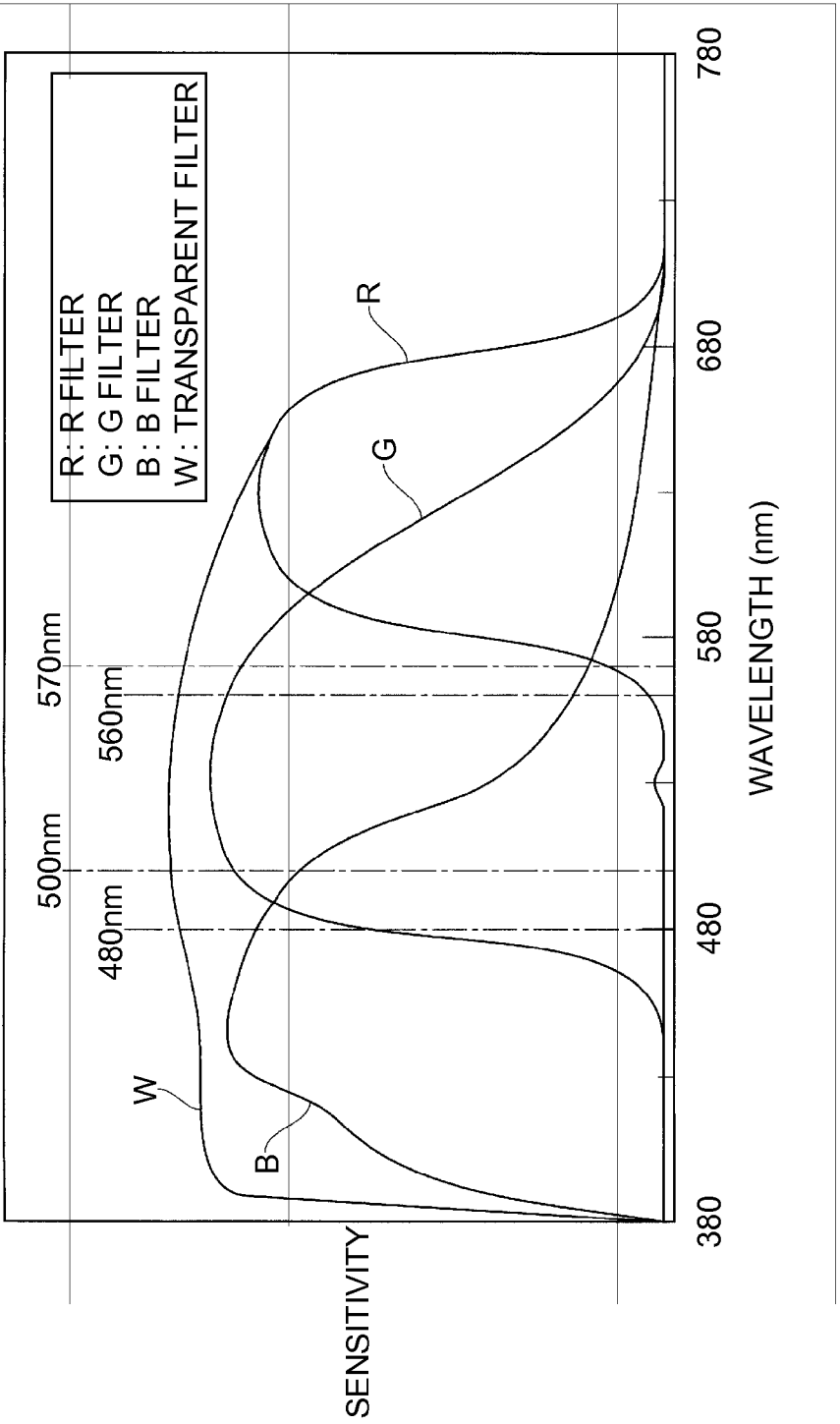
FIG. 19 is a graph showing spectral sensitivity characteristics of a light receiving element provided with an R filter, a G filter, a B filter, and a W filter (transparent filter).

In FIG. 19 showing the spectral sensitivity characteristics of the color filter array (light receiving elements), the peak of the transmittance of the transparent filters W (peak of the sensitivity of the white pixels) is in the range of wavelength 480 nm or more and 570 nm or less. The transmittance of the transparent filters W is higher than the transmittance of the RB filters in the range of wavelength 500 nm or more and 560 nm or less. Therefore, the transparent filters W also satisfy the conditions (2) and (3). As with the transparent filters W, the G filters also satisfy the conditions (1) to (3).

In this way, the transparent filters W satisfy the conditions (1) to (3), and the transparent filters W can be used as the first filters of the present invention. In the color filter array, since part of the G filters corresponding to the G color that most contributes to the luminance signals among the three primary colors of RGB are replaced by the transparent filters W, the condition (4) is also satisfied.

<Emerald Filters (E Filters)>

Although the embodiments mainly illustrate color filters made of color filters corresponding to RGB colors, part of the color filters may be filters of another color, such as filters E corresponding to an emerald (E) color (emerald pixels). Particularly, the emerald filters (E filters) may be arranged in place of part of the first filters (G filters). In this way, using the color filter array of four colors with part of the G filters replaced by the E filters can improve the reproducibility of high frequency components of luminance, can reduce the jagginess, and can improve the resolution.

Figure 20:
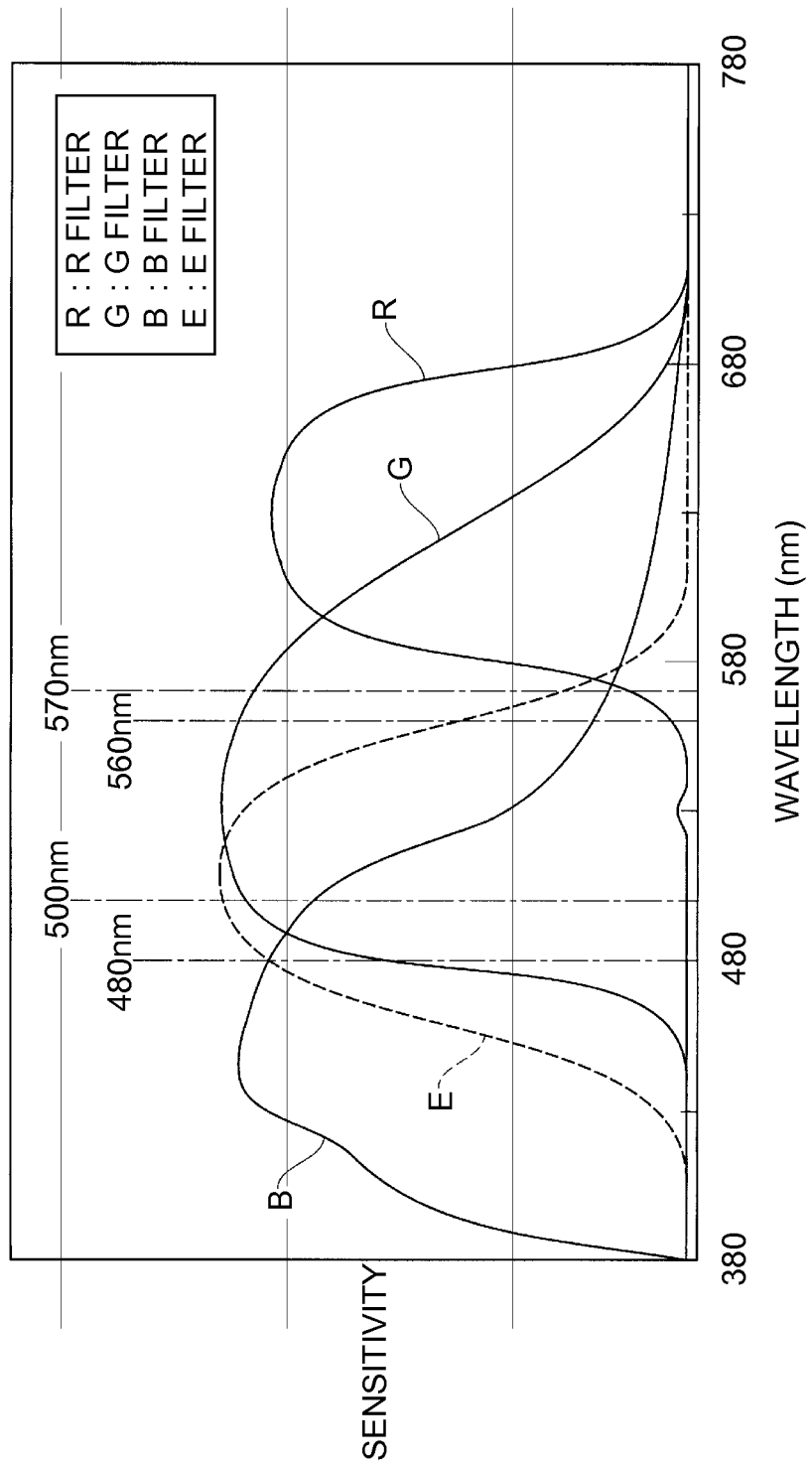
FIG. 20 is a graph showing spectral sensitivity characteristics of a light receiving element provided with an R filter, a G filter, a B filter, and an emerald filter E (E filter).
Figure 21:
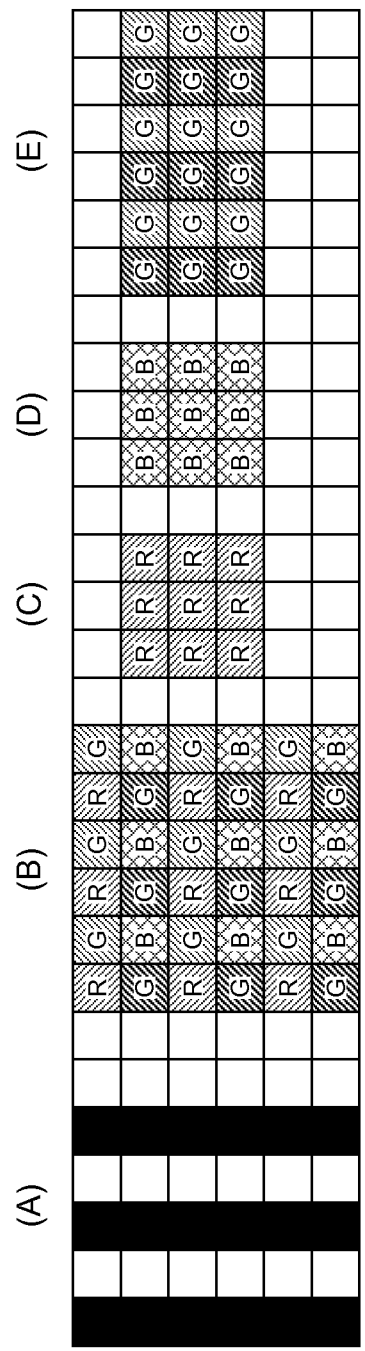
FIG. 21 is a diagram used to explain a problem of a color imaging element with color filters in a conventional Bayer array.

In FIG. 20 showing the spectral sensitivity characteristics of the color filter array (light receiving elements), the peak of the transmittance of the emerald filters E (peak of the sensitivity of the E pixels) is in the range of wavelength 480 nm or more and 570 nm or less. The transmittance of the emerald filters E is in the range of wavelength 500 nm or more and 560 or less and is higher than the transmittance of the RB filters. Therefore, the emerald filters E satisfy the conditions (2) and (3). In the color filter array, since part of the G filters corresponding to the G color that most contributes to the luminance signals among the three primary colors of RGB are replaced by the emerald filters E, the condition (4) is also satisfied.

Although the wavelength of the peak of the emerald filters E is shorter than that of the G filters in the spectral characteristics shown in FIG. 20, the wavelength of the peak is longer than that of the G filters (color looks a little closer to yellow) in some cases. In this way, the emerald filters E satisfying the conditions of the present invention can be selected, and for example, the emerald filters E satisfying the condition (1) can also be selected.

<Other Types of Color>

Although the color filter arrays formed by the color filters of primary colors RGB have been described in the embodiments, the present invention can also be applied to, for example, color filter arrays with color filters of four complementary colors including G in addition to C (cyan), M (magenta), and Y (yellow) that are complementary colors of the primary colors RGB. In this case, color filters satisfying any of the conditions (1) to (4) are the first filters of the present invention, and the other color filters are the second filters.

Although the embodiments are used to describe the present invention, the technical scope of the present invention is not limited to the scope described in the embodiments. It is apparent to those skilled in the art that the embodiments can be changed or improved in various ways. Furthermore, the present invention is not limited to the embodiments, and it is obvious that various modifications can be made without departing from the spirit of the present invention.

What is claimed is:

1. A single-plate color imaging element including color filters in a specific color filter array, which includes first filters corresponding to a first color with one or more colors and second filters corresponding to a second color with two or more colors with contribution ratios for obtaining luminance signals lower than the first color, on a plurality of pixels formed by photoelectric conversion elements, wherein color filters of the same color are arranged on a predetermined number of vertically and horizontally adjacent photoelectric conversion elements, the color filter array includes a plurality of unit blocks, each unit block including the color filters arranged on the predetermined number of vertically and horizontally adjacent photoelectric conversion elements, the color filter array includes a basic array pattern including the unit blocks arranged in a square grid shape, the basic array pattern is repeatedly arranged in a horizontal direction and a vertical direction, one or more first filters are arranged in each line in the horizontal, vertical, upper right, and lower right directions of the color filter array, one or more second filters corresponding to each color of the second color are arranged in each line in the horizontal and vertical directions of the color filter array, and a proportion of the number of pixels of the first color corresponding to the first filters is greater than a proportion of the number of pixels of each color of the second color corresponding to the second, wherein the first color is green (G), and the second color is red (R) and blue (B), wherein the basic array pattern is a square array pattern corresponding to a unit block of 6×6, and the color filter array includes first arrays and second arrays alternately arranged in the horizontal direction and the vertical direction, the first array corresponding to 3×3 unit blocks, the first array including unit blocks of G filters arranged at a center and four corners, the first array including unit blocks of B filters arranged above and below across the G filter at the center, the first array including unit blocks of R filters arranged on the left and right, the second array corresponding to 3×3 unit blocks, the second array including unit blocks of G filters arranged at a center and four corners, the second array including unit blocks of R filters arranged above and below across the G filter at the center, the second array including unit blocks of B filters arranged on the left and right.

2. The color imaging element according to claim 1, comprising a pupil division device arranged above the photoelectric conversion elements, wherein light incident on the pupil division device is pupil-divided and guided to light receiving surfaces of the predetermined number of photoelectric conversion elements.

3. An imaging apparatus comprising the color imaging element according to claim 1.

* * * * *